(12) United States Patent
Labonte et al.

(10) Patent No.: US 8,255,559 B2
(45) Date of Patent: *Aug. 28, 2012

(54) DATA STREAMING THROUGH TIME-VARYING TRANSPORT MEDIA

(75) Inventors: Francis Roger Labonte, Sherbrooke (CA); Sebastien Cote, Montreal (CA); Yves Lefebvre, Sherbrooke (CA)

(73) Assignee: Vantrix Corporation, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/417,271

(22) Filed: Mar. 11, 2012

(65) Prior Publication Data

US 2012/0173676 A1   Jul. 5, 2012

Related U.S. Application Data

(60) Continuation of application No. 12/939,062, filed on Nov. 3, 2010, now Pat. No. 8,135,856, which is a division of application No. 12/180,704, filed on Jul. 28, 2008, now Pat. No. 7,844,725.

(51) Int. Cl.
*G06F 15/16* (2006.01)
*G01R 31/08* (2006.01)

(52) U.S. Cl. ........ 709/231; 709/203; 709/233; 370/229; 370/235

(58) Field of Classification Search .................. None
See application file for complete search history.

(56) References Cited

U.S. PATENT DOCUMENTS

| | | |
|---|---|---|
| 6,208,620 B1 | 3/2001 | Sen et al. |
| 6,400,954 B1 | 6/2002 | Khan |
| 7,041,941 B2 | 5/2006 | Faries et al. |
| 7,260,826 B2 | 8/2007 | Zhang et al. |
| 7,299,291 B1 | 11/2007 | Shaw |
| 7,400,588 B2 | 7/2008 | Izzat et al. |
| 7,444,425 B2 | 10/2008 | Lehmann et al. |
| 7,720,983 B2 | 5/2010 | Klemets et al. |
| 7,843,824 B2 | 11/2010 | Wu |
| 7,844,725 B2 | 11/2010 | Labonte |

(Continued)

FOREIGN PATENT DOCUMENTS

EP   1372304   12/2003

(Continued)

OTHER PUBLICATIONS

R.Braden "RFC 1122-Requirement for Internet Hosts-Communication Layers" Oct. 1989, pp. 1-116.

(Continued)

*Primary Examiner* — Ranodhi Serrao
(74) *Attorney, Agent, or Firm* — IP-MEX Inc.; Victoria Donnelly

(57) ABSTRACT

A method of data streaming from an encoder to a decoder through a time-varying connection, is disclosed. The method includes associating an encoding coefficient with said time-varying connection, the encoding coefficient determining a flow rate at an output of said encoder; defining a performance metric of the time-varying connection; defining an acceptance interval of the performance metric having a lower bound and an upper bound; acquiring a set of performance measurements of the time-varying connection over a time window at a current encoding coefficient; determining a current value of the metric of the time-varying connection according to the set of measurements; determining a preferred encoding coefficient according to the current value of the metric; and modifying the current encoding coefficient based on the current value of the metric and the acceptance interval to attain the preferred encoding coefficient. A corresponding streaming server and system for data streaming are also provided.

20 Claims, 22 Drawing Sheets

U.S. PATENT DOCUMENTS

| | | |
|---|---|---|
| 8,014,470 B2 | 9/2011 | Lee et al. |
| 2002/0164024 A1 | 11/2002 | Arakawa et al. |
| 2002/0173315 A1 | 11/2002 | Chmaytelli |
| 2003/0002609 A1 | 1/2003 | Faller |
| 2003/0229693 A1 | 12/2003 | Mahlik et al. |
| 2004/0098748 A1 | 5/2004 | Bo et al. |
| 2004/0179506 A1 | 9/2004 | Padovani et al. |
| 2005/0021821 A1 | 1/2005 | Turnbull et al. |
| 2005/0060364 A1 | 3/2005 | Kushwaha et al. |
| 2005/0105604 A1 | 5/2005 | Ito et al. |
| 2005/0268237 A1 | 12/2005 | Crane |
| 2007/0091815 A1 | 4/2007 | Tinnakornsrisuphap et al. |
| 2007/0115918 A1 | 5/2007 | Bodin et al. |
| 2008/0052414 A1 | 2/2008 | Panigrahi |
| 2008/0062322 A1 | 3/2008 | Dey |
| 2008/0075163 A1 | 3/2008 | Brydon et al. |
| 2008/0086570 A1 | 4/2008 | Dey |
| 2008/0117887 A1 | 5/2008 | Joung et al. |
| 2008/0133766 A1 | 6/2008 | Luo |
| 2008/0146241 A1 | 6/2008 | Das et al. |
| 2008/0300025 A1 | 12/2008 | Song et al. |
| 2010/0020717 A1 | 1/2010 | McGregor et al. |
| 2010/0023635 A1 | 1/2010 | Labonte et al. |
| 2011/0007834 A1 | 1/2011 | Hoshino et al. |
| 2011/0131335 A1 | 6/2011 | Spaltro et al. |

FOREIGN PATENT DOCUMENTS

| | | |
|---|---|---|
| EP | 1821442 | 8/2005 |
| EP | 1821442 | 8/2007 |
| WO | WO 2004/056028 | 7/2004 |
| WO | WO 2004/072766 | 8/2004 |
| WO | WO 2005/122025 | 12/2005 |
| WO | WO 2006/086691 | 8/2006 |
| WO | WO2007/027891 | 3/2007 |

OTHER PUBLICATIONS

Intel Integrated Performance Primitives 6.0—Code Samples, published at http://software.intel.com/en-us/arficles/, May 2009.

"Ortive Stream Shaper" brochure, published by Ortive Wireless, Inc. at www.ortivawireless.com, California, USA, prior to Jul. 25, 2008.

"How will you deliver high-quality video to millions of media-hungry mobile subscriber?", published by Calve Wireless, Inc. at www.ortivawireless.com, California, USA, prior to Jul. 25, 2008.

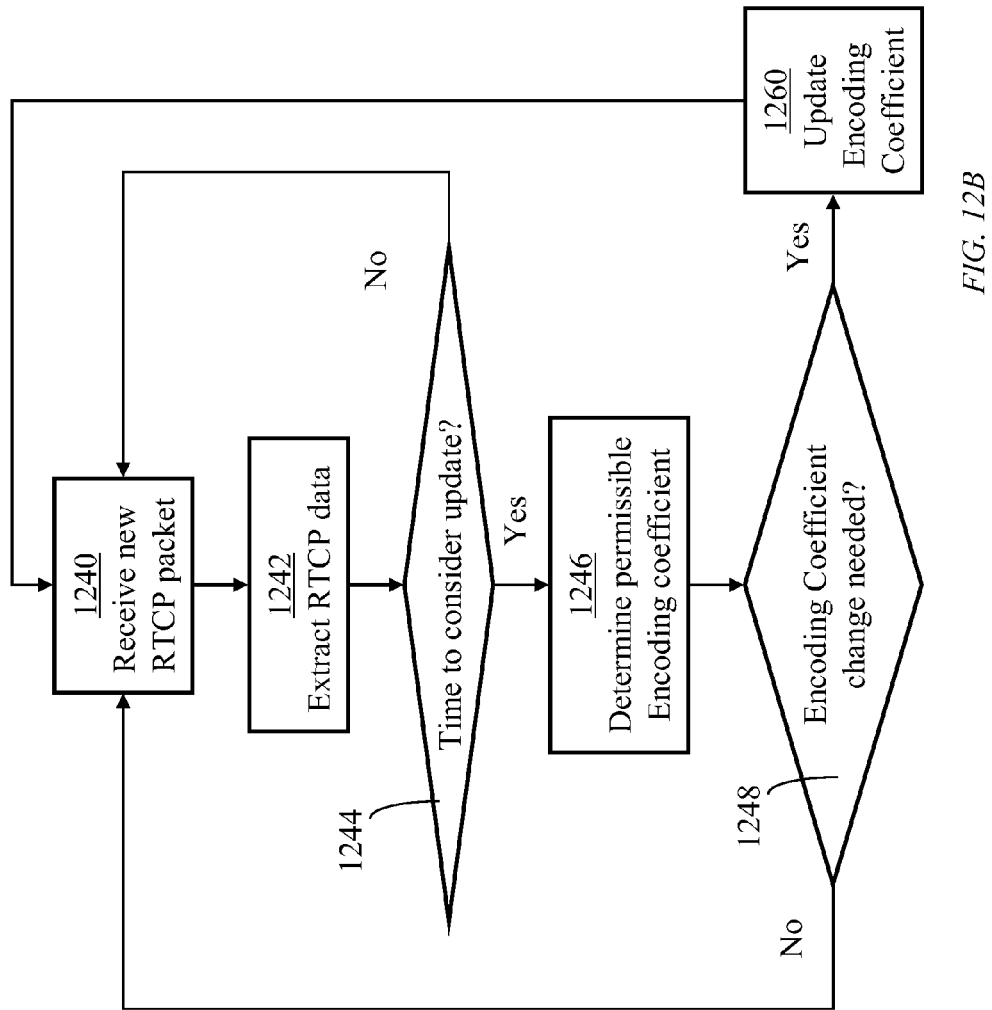
*FIG. 12B*
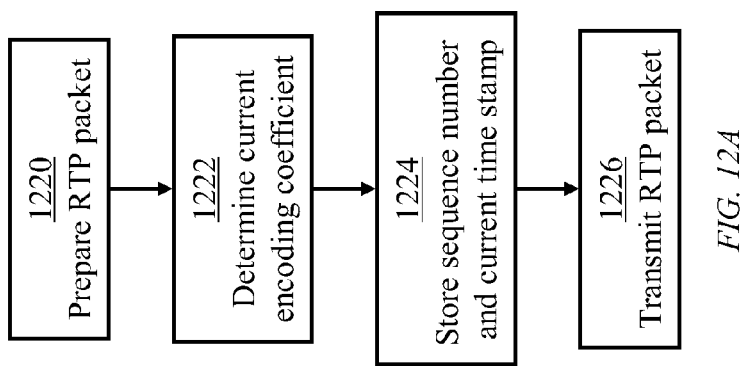
*FIG. 12A*
*FIG. 12*

DATA STREAMING THROUGH TIME-VARYING TRANSPORT MEDIA

RELATED APPLICATIONS

This application is a continuation of U.S. application Ser. No. 12/939,062 filed on Nov. 3, 2010, now issued as a U.S. Pat. No. 8,135,856 on Mar. 13, 2012, which, in turn, is a divisional of U.S. application Ser. No. 12/180,704 filed on Jul. 28, 2008, now issued as a U.S. Pat. No. 7,844,725 issued on Nov. 30, 2010 to Labonte entitled "Data Streaming Through Time-Varying Transport Media".

FIELD OF THE INVENTION

The present invention relates to data communication from a source to multiple sinks where the source may adapt its flow rate to an individual sink according to conditions of a path from the source to the individual sink.

BACKGROUND OF THE INVENTION

In a data-streaming system, a server may communicate with multiple sinks. In general, a path from a data source associated with the server to an individual data sink comprises a first span from the source to a first switching node in a shared network, a switched path through the shared network from the first switching node to a second switching node of the shared network, and a second span from the second switching node to the individual sink. The maximum flow rate that can be sustained by a path may vary with time according to load conditions of a shared network and physical conditions of transmission media. Any path segment may be shared by multiple connections which may be assigned different priority designations.

If a connection carries delay-tolerant data, such as computer files, the integrity of transmitted data may be preserved, as the conditions of a path fluctuates, using known end-to-end protocols which may rely on retransmission of lost data or data perceived to be lost. If a connection carries delay-sensitive data such as real-time video signals where data retransmission is not desirable, it is of paramount importance that the signal source, or a signal encoder associated with a signal source, adapt the signal content according to a perceived capacity of a respective connection.

There is therefore a need for responsive means for real-time connection-state evaluation and signal-content adaptation to ensure preserving service quality as connection-state varies with time.

SUMMARY OF THE INVENTION

The present invention provides methods and apparatus for controlling flow rate of data from a source to a sink according to conditions of a path from the source to the sink.

In accordance with one aspect, the present invention provides a method of data streaming from an encoder to a decoder through a time-varying connection. The method comprises steps of: acquiring measurements characterizing the connection; estimating transmittance variation of the connection according to the measurements; determining an adjustment of a current encoding rate of the encoder compatible with the transmittance variation to attain a favorable encoding rate; and instructing the encoder to encode a signal according to the favorable encoding rate. The connection is initially assigned a nominal encoding rate which may be negotiated or determined according to a classification of the encoder.

The measurements may comprise performance characteristics such as transfer delay between the encoder and the decoder, proportion of data loss, or occupancy of a receiving buffer at the decoder. The measurements are preferably acquired over a time window of a predefined duration.

The encoding rate may be updated by multiplying the nominal encoding rate by a first encoding coefficient which is determined according to a first metric derived from the measurements. The first encoding coefficient may be determined according to a predefined function of the first metric. The first metric may be selected as a mean value of the measurements over the time window.

Alternatively, the encoding rate may be updated by multiplying the nominal encoding rate by a second encoding coefficient determined according to a second metric based on measurement trend during the time window. The encoding coefficient may be updated by multiplying its current value by a factor determined according to a predefined function of the second metric. The measurement trend may be based on a slope of a regression line relating measurements to time during the time window. The measurement trend may also be based on both the slope of the regression line and a gradient of measurements during a short period within the time window.

In accordance with another aspect, the present invention provides a method of determining an adaptable encoding rate of a signal transmitted from a data-streaming server to a client device through a time-varying connection. The method comprises steps of: determining a current encoding rate for the connection; acquiring transfer-delay measurements over a time window between a first time instant and a second time instant; and acquiring a data-loss-ratio measurement over the time window. A regression line relating the transfer-delay measurements to respective time instants within the time window may then be determined and the slope of the regression line is considered to indicate a trend of the measurements. A gradient of selected transfer-delay measurements immediately preceding the second time instant is also determined.

A first tentative encoding rate may be determined according to the slope and the gradient and a second tentative encoding rate may be determined according to the data-loss-ratio measurement. A preferred encoding rate may then be selected as the lesser of the first encoding rate and the second encoding rate, thus meeting the more stringent of the transfer-delay and data-loss requirements.

The method further comprises a step of acquiring a measurement of occupancy of a buffer associated with the client device. If the preferred encoding rate, which satisfies the transfer-delay and data-loss performance requirements, exceeds a nominal encoding rate and the occupancy exceeds a predefined buffer-occupancy threshold, the preferred encoding rate is reduced to equal the nominal encoding rate in order to avoid buffer overflow. The first tentative encoding rate may be determined by multiplying the current encoding rate by a first encoding coefficient E* determined according a predefined function: $E^* = \Gamma(\alpha, \beta)$, where $\alpha$ is the slope of the regression line and $\beta$ is the gradient.

The method further compares the data-loss-ratio measurement, denoted $\square$, with a lower bound $\square_{min}$ and an upper bound $\square_{max}$ of a predefined data-loss-ratio acceptance interval. If $\square > \square_{max}$, a second encoding coefficient E is determined as $E^{} = (1 \square)$. If $\square < \square_{min}$, the second encoding coefficient E is determined as $E^{} = \square > 1$, where $\square$ is a design parameter. The current encoding rate may then be multiplied by the second encoding coefficient $E^{**}$ to determine the second encoding rate.

In accordance with a further aspect, the present invention provides a system for data streaming. The system comprises a streaming server in communication with a plurality of clients each client having a decoder, a data buffer, and a sink reporter.

The streaming server comprises: a signal source; an adaptable encoder for encoding signals produced by the signal source; a source reporter for formulating downstream control packets directed to a plurality of clients; and a flow controller for receiving upstream control packets from the plurality of clients and determining individual encoding coefficients for the plurality of clients. Each encoding coefficient determines an encoding rate for a signal directed to a respective client.

A sink reporter associated with a specific client formulates upstream control packets directed to the flow controller. The flow controller uses downstream control packets and corresponding upstream control packets exchanged through a connection between the streaming server and the specific client to determine a current condition of the connection.

A downstream control packet sent from the source reporter to a specific client contains a packet identifier. A corresponding upstream control packet sent by a sink reporter of the specific client in response to the specific downstream control packet contains the packet identifier.

An upstream control packet may also contain an indication of occupancy of a data buffer associated with the specific client. The flow controller processes the upstream control packet of the specific client to determine an indicator of transfer delay from the streaming server to the specific client and a proportion of lost downstream control packets.

In accordance with another aspect, the present invention provides a method of data streaming from an encoder to a decoder through a time-varying connection. The method comprises steps of: associating an encoding coefficient with the encoder for determining a flow rate of an output of the encoder; defining a performance metric of the connection and an acceptance interval of the performance metric having a lower bound and an upper bound; acquiring a set of performance measurements of the connection over a time window at a current encoding coefficient; determining a current value of the metric of the connection according to the set of measurements; and adjusting the encoding coefficient to a preferred encoding coefficient according to the current value of the metric and the acceptance interval.

If the current value of the metric is lower than the lower bound of the acceptance interval the current encoding coefficient is multiplied by a first factor to produce the preferred encoding coefficient. If the current value of the metric exceeds the upper bound, the current encoding coefficient is multiplied by a second factor to produce the preferred encoding coefficient. The first factor exceeds 1 and the second factor is less than 1. Preferably, a product of the first factor and the second factor is less than 1. If the current value of the metric is within the acceptance interval, the current encoding coefficient remains unchanged.

The first factor may be determined as a function of a difference between the lower bound and the current value of the metric. The second factor may be determined as a function of a difference between the current value of the metric and the upper bound. The metric may be determined as a mean value of transfer delay during the time window, a mean value of data loss during the time window, or an indicator of occupancy of a decoder buffer measured at the end of the time window, where the decoder buffer holds data received through the connection.

The method further comprises a step of instructing the encoder to encode a signal according to the preferred encoding coefficient and a nominal encoding rate if the preferred encoding coefficient differs appreciably from the current encoding coefficient.

In accordance with a further aspect, the present invention provides a method of data streaming from an encoder to a decoder through a time-varying connection based on gauging multiple performance characteristics of the connection. The method comprises steps of: associating an encoding coefficient with the connection, where the encoding coefficient determines a flow rate of an output of the encoder; associating multiple performance characteristics with the connection; and defining multiple performance metrics having one-to-one correspondence to the multiple performance characteristics.

At a current encoding coefficient, multiple sets of performance measurements of the connection over a time window are acquired, where each set of performance measurements corresponds to one of the multiple performance characteristics. A current value of each performance metric is determined using a corresponding set of measurements to produce a set of current values of performance metrics. A preferred encoding coefficient is then determined according to the current value of each performance metric.

The method further adjusts the encoding coefficient by comparing current values of the multiple performance metrics with respective acceptance intervals. A set of acceptance intervals, each corresponding to one of the multiple performance metrics is defined. Each acceptance intervals is defined by a respective lower bound and a respective upper bound. The current encoding coefficient is multiplied by a first factor, greater than 1, to produce the preferred encoding coefficient when each element in the set of current values of performance metrics is lower than a lower bound of a corresponding acceptance interval. The current encoding coefficient is multiplied by a second factor, less than 1, to produce the preferred encoding coefficient when at least one element in the set of current values of performance metrics exceeds an upper bound of a corresponding acceptance interval.

The first factor exceeds 1 and the second factor is less than 1. In order to cause the encoding-coefficient to increase at a slow pace and decrease at a relatively faster pace, the product of the first factor and the second factor may be selected to be less than 1.

The multiple performance characteristics may comprise transfer delay from the encoder to the decoder, data loss, and occupancy of a decoder buffer holding data received through the connection. The multiple performance metrics may comprise: a mean value of transfer delay during the time window; a mean value of data loss during the time window; and a value of occupancy of the decoder buffer during the time window. The multiple sets of performance measurements are acquired through exchange of control data between the encoder and the decoder. The exchange of data may be based on using the real-time transport protocol (RTP) and the real-time transport control protocol (RTCP).

In accordance with another aspect, the present invention provides a method of determining an adaptable encoding rate of a signal transmitted from a data-streaming server to a client device through a time-varying connection. The method comprises steps of: determining a current encoding rate for the connection; acquiring measurements of a specific characteristic of the connection over a time window encompassing W measurements between a first time instant and a second time instant; and determining a metric □ of the specific characteristic from the measurements.

If $\mu$ is within a predefined acceptance interval having a lower bound $\mu_1$ and an upper bound $\mu_2$, the current encoding rate need not change. Otherwise, the current encoding rate may be multiplied by a factor $\chi_2<1$ if $\mu$ exceeds the upper bound $\mu_2$ of the acceptance interval or by a factor $\chi_1>1$ if $\mu$ is below the lower bound $\mu_1$ of the acceptance interval.

If the specific characteristic is a transfer delay along the connection, the metric is determined according to steps of: acquiring a measurement □ of the transfer delay; updating a summation $\Sigma$ by adding the measurement $\sigma$ and subtracting an entry at a current index in a circular array V, where the circular array has W>1 entries storing previous measurements of the specific characteristic; and storing the measurement $\sigma$ in the circular array at the current index. A counter representing a cumulative number of measurements is increased by 1, and current index is updated by adding 1 (modulo W), i.e., when the Index reaches a value of W, the Index is reset to 0. The use of the index, modulo W, facilitates storing the most recent W measurements and the purpose of the counter is to space successive time windows during which metrics are determined. Thus, the summation $\Sigma$, used as the metric $\mu$, is used to determine the need for encoding-rate adjustment only if the counter equals or exceeds a threshold P*. The purpose of using the summation $\Sigma$ instead of a mean value $\Sigma/W$, is to reduce the computational effort. The lower bound $\mu_1$ is determined as a lower bound of an acceptable transfer delay multiplied by W and the upper bound $\mu_2$ is determined as an upper bound of an acceptable transfer delay multiplied by W. The counter is reset to zero after any adjustment of the current encoding rate. The threshold P* is selected to be sufficiently large so that a time gap between any two successive steps of adjusting the current encoding rate exceeds a predefined minimum time gap. The factor $\chi_1$ may be determined as a function of $(\mu_1-\Sigma)$ and the factor $\chi_2$ is determined as a function of $(\Sigma-\mu_2)$.

If the specific characteristic is a data-loss ratio, the metric $\mu$ is a data-loss ratio $\theta$ determined over the time window. The lower and upper bounds $\mu_1$ and $\mu_2>\mu_1$ are bounds of an acceptable data-loss ratio. The factor $\chi_1$ is determined as a predetermined multiplier $\chi>1$ when $\theta$ is less than $\mu_1$, and the factor $\chi_2$ is determined as $(1-\theta)$ for $\theta>\mu_2$.

BRIEF DESCRIPTION OF THE DRAWINGS

Embodiments of the present invention will be further described with reference to the accompanying exemplary drawings, in which:

FIG. 12 is a flow chart illustrating steps of acquiring connection measurements using the Real-time transport protocol (RTP) and Real-time control transport protocol (RTCP) in accordance with an embodiment of the present invention;

DETAILED DESCRIPTION OF THE EMBODIMENTS OF THE INVENTION

Terminology

Figure 1:
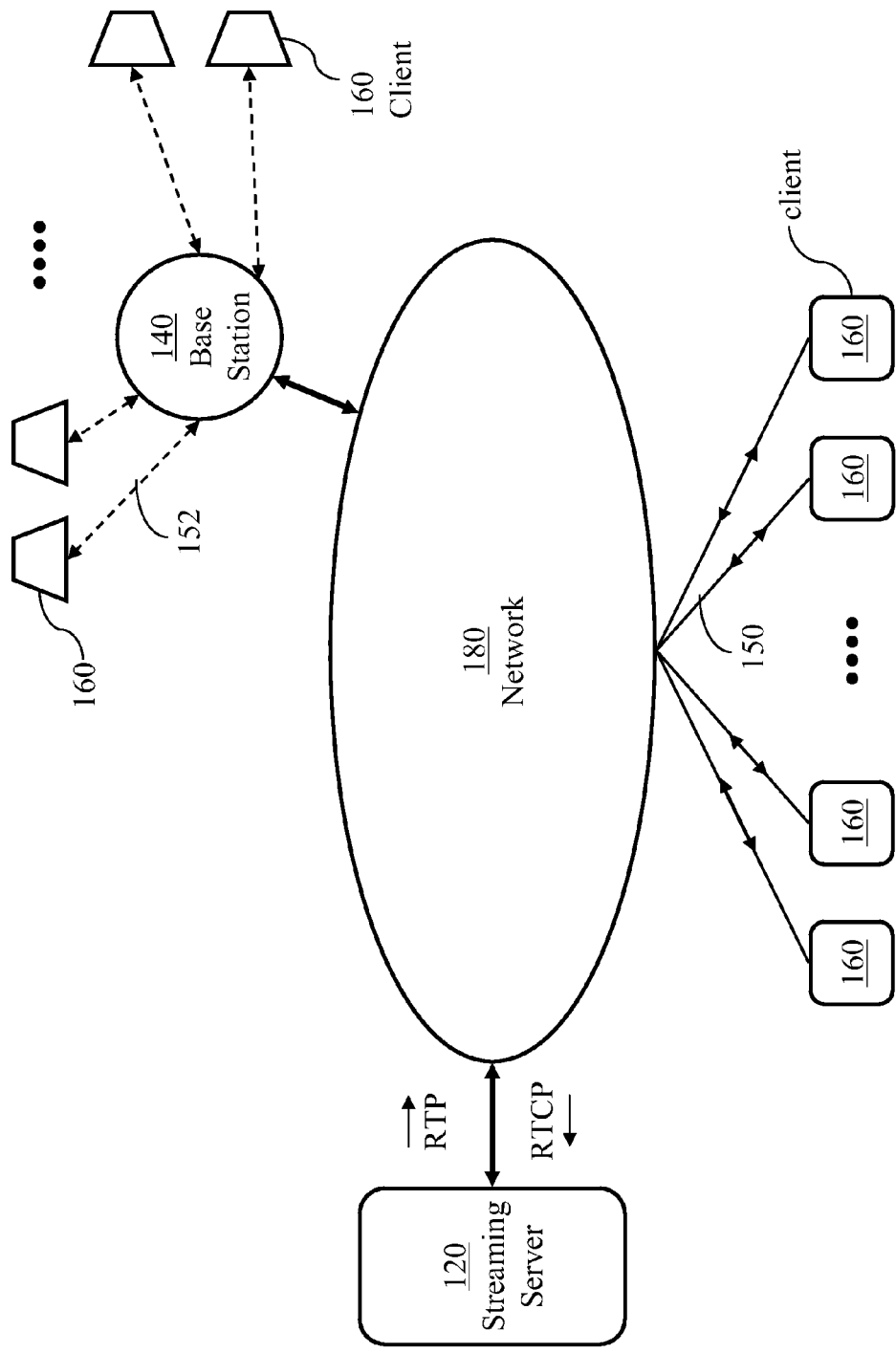
FIG. 1 illustrates a network incorporating a system of flow-rate adaptation for connections of time-varying capacities in accordance with an embodiment of the present invention.

Encoding flow rate: The bit rate of an encoded signal may fluctuate with time and the maximum bit rate of the encoded signal is herein called a flow rate.
Adaptive encoder: An adaptive encoder is a device capable of encoding a signal to a specified flow rate within a predefined flow-rate range. The encoding attempts to maximize encode-signal fidelity.
Nominal flow rate: A flow rate negotiated between a client and a streaming server, or determined automatically by a streaming server based on knowledge of client's equipment is herein called a nominal flow rate.
Encoding coefficient: An encoding coefficient, denoted E, is a scaling factor which is multiplied by the nominal flow rate to determine a preferred flow rate compatible with a current state of a connection between a streaming server and a client.
Connection transmittance: The maximum flow rate which can be sustained by a connection from a streaming server to a client without violating preset performance objectives is herein called a connection transmittance.
Performance characteristic: Performance characteristics are defined herein as measurable connection properties such as transfer-delay variation, data-loss proportion, signal distortion, etc.
Scalar measurement: A connection measurement related to only one connection property is a scalar measurement.
Vector measurement: A number of contemporaneous connection measurements form a vector measurement.
Statistic: A statistic is a value (such as a mean value) derived from a set of data samples.
Metric: A Metric is a measure of a quality of a path or a connection in a telecommunication network. A Metric may relate to a connection property such as latency, reliability, capacity, etc., of a path or connection within a path.
Scalar metric: A metric related to one connection property is herein called a scalar metric. A scalar metric is determined from a number of scalar measurements.
Vector metric: A metric related to at least two connection properties is herein called a vector metric. A vector metric is determined from a number of vector measurements.
Acceptance interval: A range of metrics, between a predefined lower bound and a predefined upper bound, considered to indicate acceptable path or connection performance is herein called an acceptance interval.
Downstream control packet: A control packet sent from a streaming server to a client is a downstream control signal.
Upstream control packet: A control packet sent from a client to a streaming server is an upstream control signal.
Gradient: Conventionally, the slope of a continuous function relating two variables is known as a gradient. In the case of a sampled function, the gradient may be approximated by determining the slope from a small number of samples. Herein, the gradient is the slope of measurement samples determined over a period covering a small number of samples.
Regression line: A straight line drawn through a set of data and determined according to some criterion, such as minimizing the sum of squares of data deviation from the straight line, is a regression line. The slope of a regression line may reliably indicate a trend of the data if the data dispersion meets certain conditions.
Real-time transport protocol (RTP): RTP defines a standardized packet format for delivering audio and video over the Internet (defined by the Internet Engineering Task Force (IETF), RFC 3550).
Real-time transport control protocol (RTCP): RTCP provides out-of-band control information for an RTP flow and is used periodically to transmit control packets in a streaming session. The primary function of RTCP is to provide feedback on connection quality.

FIG. 1 illustrates a system for data streaming where a streaming server computing device 120, also to be referred to as streaming server 120, transmits data to client devices 160, also called clients 160, through a shared network 180, such as the Internet. A client 160 comprises a processor and a computer readable medium, it is connected to network 180 through a wire-line access medium 150 or a wireless access medium 152 through a base station 140 which may be connected to network 180 through a wireline or a wireless medium. In a preferred embodiment, the server 120 uses existing protocols to exchange control data with clients 160. For example, the streaming server 120 may use the real-time transport protocol (RTP) to send control data to a client 160 and the client may use the real-time transport control protocol (RTCP) to send control data to the streaming server. Other protocols may be devised for connection quality control. In accordance with the present invention, a client negotiates a data-encoding rate with the streaming server and the streaming server may adjust the encoding rate according to state variation of a connection between the streaming server 120 and the client. Notably, the streaming server 120 assigns individual encoding rates to the clients 160 according to negotiated nominal flow rates (bit-rates) and individual states of connections from the streaming server 120 to the clients 160. The streaming server may also recognize a client's equipment type and determine a nominal flow rate accordingly.

Figure 2:
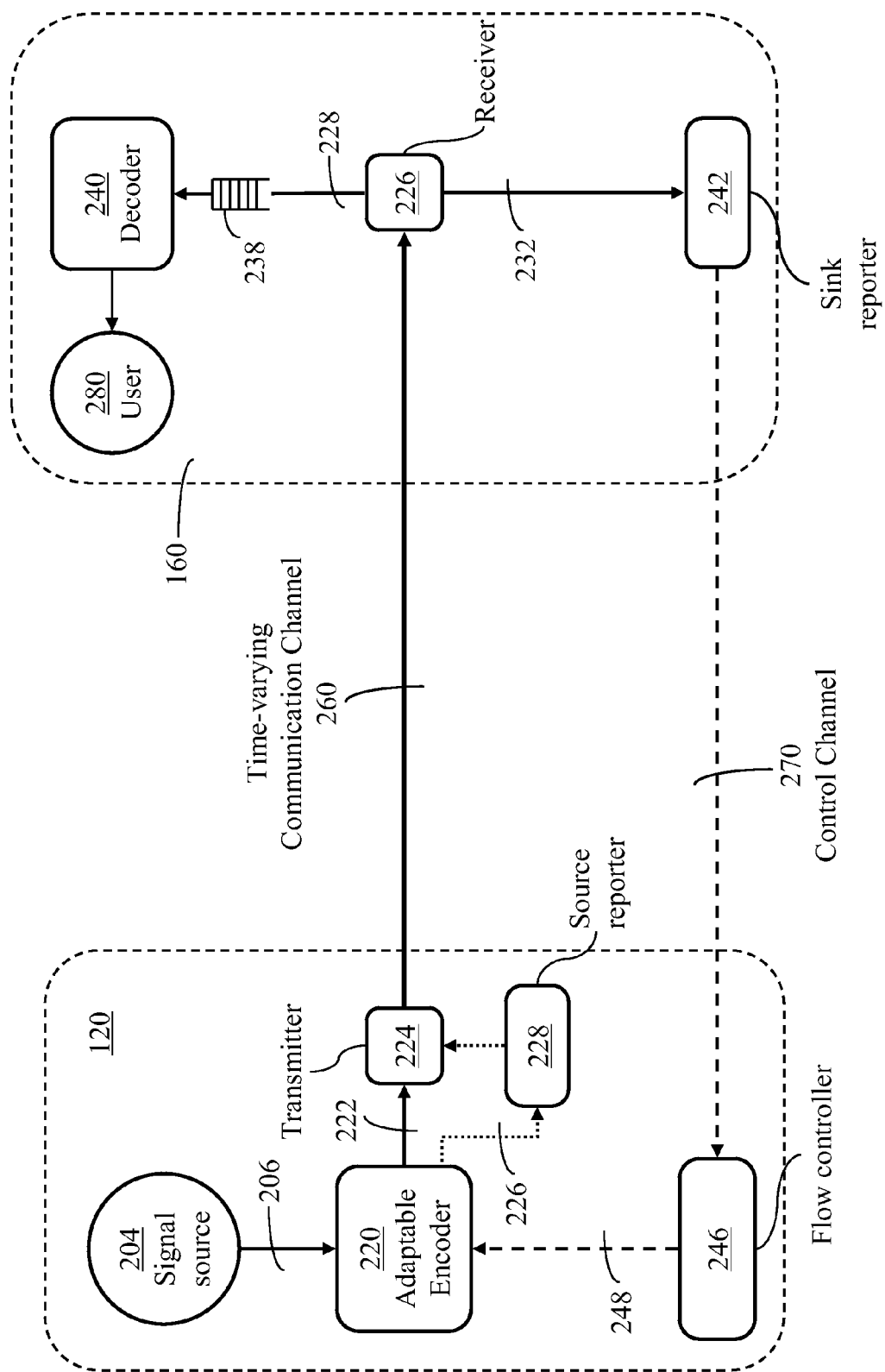
FIG. 2 illustrates a system comprising an encoder connecting to a decoder through a connection of variable capacity where the encoding rate is adapted to the state of the connection in accordance with an embodiment of the present invention.

FIG. 2 illustrates an instance of a single connection from the streaming server 120 to a client 160. The streaming server 120 comprises a signal source 204, connecting to an adaptable encoder 220 through a channel 206. The adaptable encoder 220 encodes a signal from source 204 according to a nominal flow rate and an encoding coefficient determined by a flow controller 246. The streaming server 120 connects to the client 160 through a channel 260 which may have a time-varying capacity. The client 160 comprises a receiver 226 which detects information signal (e.g., a video signal) and directs the detected signal to a decoder 240 which may organize the detected signal in a format suitable for a user 280. A buffer 238 may be associated with the decoder 240 to hold data for a short period of time. The detected signal may also contain control packets which are directed to a sink reporter 242. The sink reporter may process control packets received from the source reporter 224 and send acknowledgments and specified measurements in a control packet sent to flow controller 246 through a control channel 270.

Due to the time-varying capacity of connection 260, it is of paramount importance that the flow controller 246 determine an accurate estimation of the transmittance of the time-varying channel 260 and compute an appropriate encoding coefficient E. The adaptable encoder 220 encodes a signal according to the nominal encoding rate assigned to the client and a current value of the encoding coefficient. The flow controller 246, comprising computer readable instructions stored in a computer readable medium, determines permissible overall flow rate (bit-rate) or selectively adjusts the information content to preserve certain qualities of the signal. In the case of video signals, the encoder may modify the frame rates, the content per frame, or both.

The flow controller 246 uses measurements acquired through an exchange of control packets between the server 120 and the client 160. The source reporter 228, comprising computer readable instructions stored in a computer readable medium, formulates downstream control packets (not illustrated) to be directed to clients 160. The sink reporter 242, comprising computer readable instructions stored in a computer readable medium, associated with each client 160 formulates upstream control packets (not illustrated) to be sent to the flow controller 246. The flow controller 246 uses upstream control packets and corresponding downstream control packets exchanged through connections between the streaming server and the clients 160 to determine current states of the connections and appropriate individual encoding coefficients for the clients 160. Each encoding coefficient determines an encoding rate for a signal directed to a respective client.

A specific downstream control packet sent from the source reporter 228 to a specific client 160 contains a downstream-control-packet identifier and an indicator of an instant of time at which the downstream packet is transmitted. A corresponding upstream control packet sent by a sink reporter 242 of the specific client 160 in response to the specific downstream control packet echoes the downstream-control-packet identifier and indicates a time at which the specific client received the specific downstream control packet.

The flow controller may base its computation of the encoding coefficient E on measurements received during a time window of a predefined width W. The width W may be defined in terms of a time interval, such as a few milliseconds, or a number of measurements acquired, for example, most recent 128 measurements. Hereinafter, the time window width will be expressed in terms of a number of measurement instances.

The streaming server 120 comprises at least one processor (not illustrated) and a computer readable storage medium, comprising, for example, non-volatile memory devices, DVD, CD-ROM, or floppy disks, having computer readable instructions stored thereon. The computer readable instructions are executed by at least one processor to cause the adaptable encoder 220, the source reporter 228, and the flow controller 246 to perform the functions described hereinafter.

Figure 3:
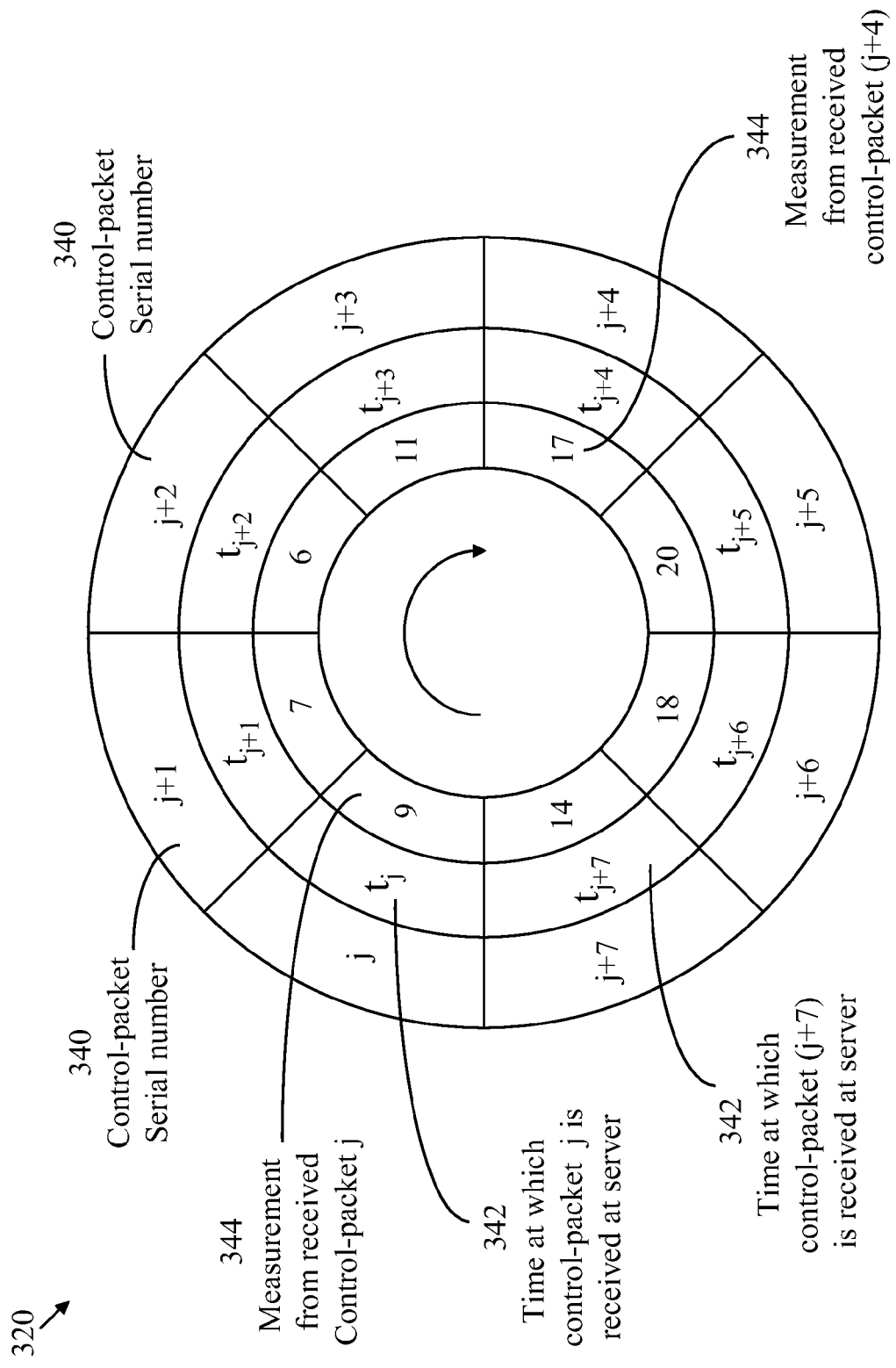
FIG. 3 illustrates a circular buffer associated with the encoder of FIG. 2 for storing selected measurements characterizing the connection in accordance with an embodiment of the present invention.

FIG. 3 illustrates measurements stored in a circular buffer 320 maintained at the flow controller 246. For clarity, the circular buffer in the illustrated example contains only eight measurements 342 acquired during time instants $t_j$ to $t_{j+7}$, (j+7) being a current observation instant. The circular buffer may hold a large number ν of records. A record may contain a single measurement (scalar measurement) or a set of contemporaneous measurements (vector measurements) together with a corresponding time indicator. A new record of index j overwrites a previous record of index (j−ν). Thus, the circular buffer 320 retains the most recent ν measurements (scalar or vector measurements). Some measurements, such as occupancy of buffer 238 associated with a decoder 240, may be extracted from upstream control packets received from client 160. Additionally, flow controller 246 may determine transfer delay by comparing a time instant at which a downstream control packet to a client 160 is sent and a time instant at which the server 120 receives a corresponding upstream control packet from the client 160. Packet loss may be detected by comparing sequential numbers of downstream control packets sent to client 160 and sequential numbers extracted from upstream packets received from client 160. The ratio of the number of lost packets to the number of downstream control packets defined a packet-loss ratio, hereinafter denoted θ.

Each record in circular buffer 320 includes (1) a serial number 340 of a downstream control packet (denoted j, j+1, j+2, . . . , etc.), (2) a time instant 342 (denoted $t_j$, $t_{j+1}$, etc.) at which an upstream control packet indicating a serial number 340 of the same record is received at the server 120; and (3) a measurement 344 included in an upstream control packet, such as occupancy of buffer 238.

Retaining sufficient serial numbers 340 enables computing packet-loss ratio over a time window of arbitrary width, within reasonable bounds. Retaining sending times of downstream control packets and receiving times 342 of corresponding upstream control packets enables computing transfer delay. Thus, measurements characterizing a connection may include measurements calculated at flow controller 246, such as transfer delay or packet-loss ratio, and measurements 344 read directly from upstream control packets.

A time window may be limited to cover a preset maximum number of control packets or a preset duration. As will be described with reference to FIG. 19, the two conditions may be used and the more stringent condition defines the time window.

Figure 4:
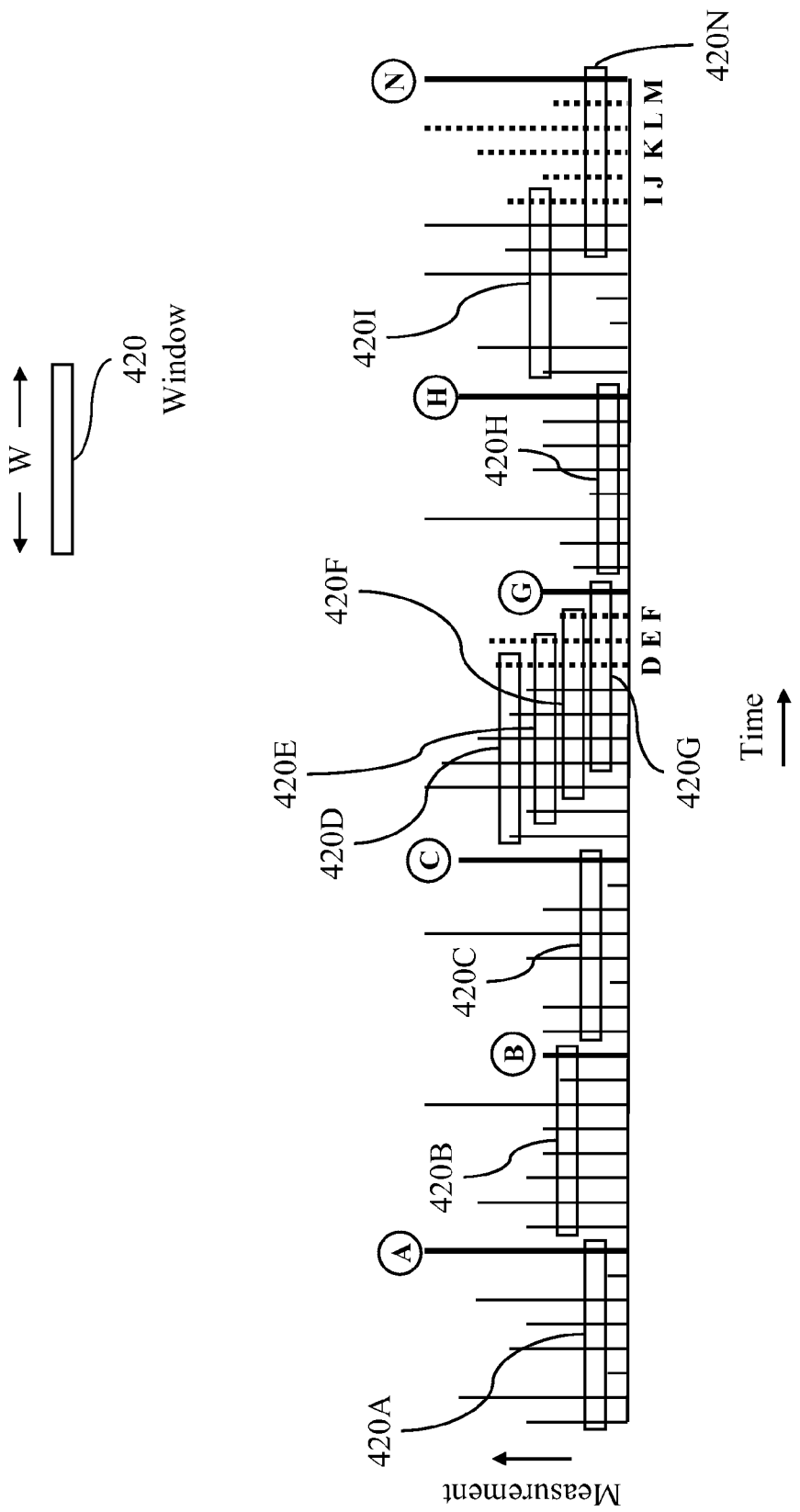
FIG. 4 illustrates connection measurements received at the encoder in the system of FIG. 2 where measurements are analyzed over disjoint or overlapping time windows in accordance with an embodiment of the present invention.

FIG. 4 illustrates a succession of measurements extracted from control packets received at the flow controller 246. Metrics characterizing the time-varying channel are computed at the end of a time window. In the example of FIG. 4, each window covers eight measurements. The metrics may cover some or all of several attributes such as delay, data loss, buffer occupancy at the decoder 240, and a signal quality determined by analyzing the output of the decoder. A measurement may be a scalar, related to one connection characteristic such as data-loss proportion, or a vector covering multiple connection characteristics such as transfer delay, data loss, and occupancy of a buffer associated with the connection.

The result of analysis of measurement data over a current window may determine the selection of a subsequent time window. If analysis of measurements over a window results in modifying the encoding rate, i.e., modifying the encoding coefficient E, a subsequent window may be separated from the current window by a significant interval of time. Otherwise, the subsequent window may be adjacent to the current window; a subsequent window may also be a moving window overlapping the current window.

In the example of FIG. 4, metrics of a connection determined after a last measurement of a window 420 may result in updating the encoding coefficient. Metrics determined at the end of window 240A resulted in updating the encoding coefficient E for the current connection. Therefore, a new window 240B immediately follows window 240A. Metrics determined at the end of window 240B also resulted in updating the encoding coefficient and, hence, window 240C immediately follows window 240B. Metrics determined at the end of window 240C resulted in updating the encoding coefficient and, hence, window 240D immediately follows window 240C. Metrics determined at the end of window 240D did not alter the encoding coefficient. Thus, a subsequent window 240 E overlaps window 240D. Metrics determined at the end of window 240E did not alter the encoding coefficient. Likewise, metrics determined at the end of overlapping window 240F did not alter the encoding coefficient. Metrics determined at the end of overlapping window 240G resulted in modifying the encoding coefficient. Therefore a new window 240H immediately follows window 240G. Metrics determined at the end of window 240H resulted in modifying the encoding coefficient and a subsequent window 240I follows immediately. None of overlapping windows (moving windows) 240I, 240J, 240K, 240L, and 240M, ending in measurements labeled I, J, K, L, and M, ended in modifying the encoding coefficient. Metrics determined at the end of overlapping window 240N resulted in modifying the encoding coefficient and a new window (not illustrated) follows immediately.

Figure 5:
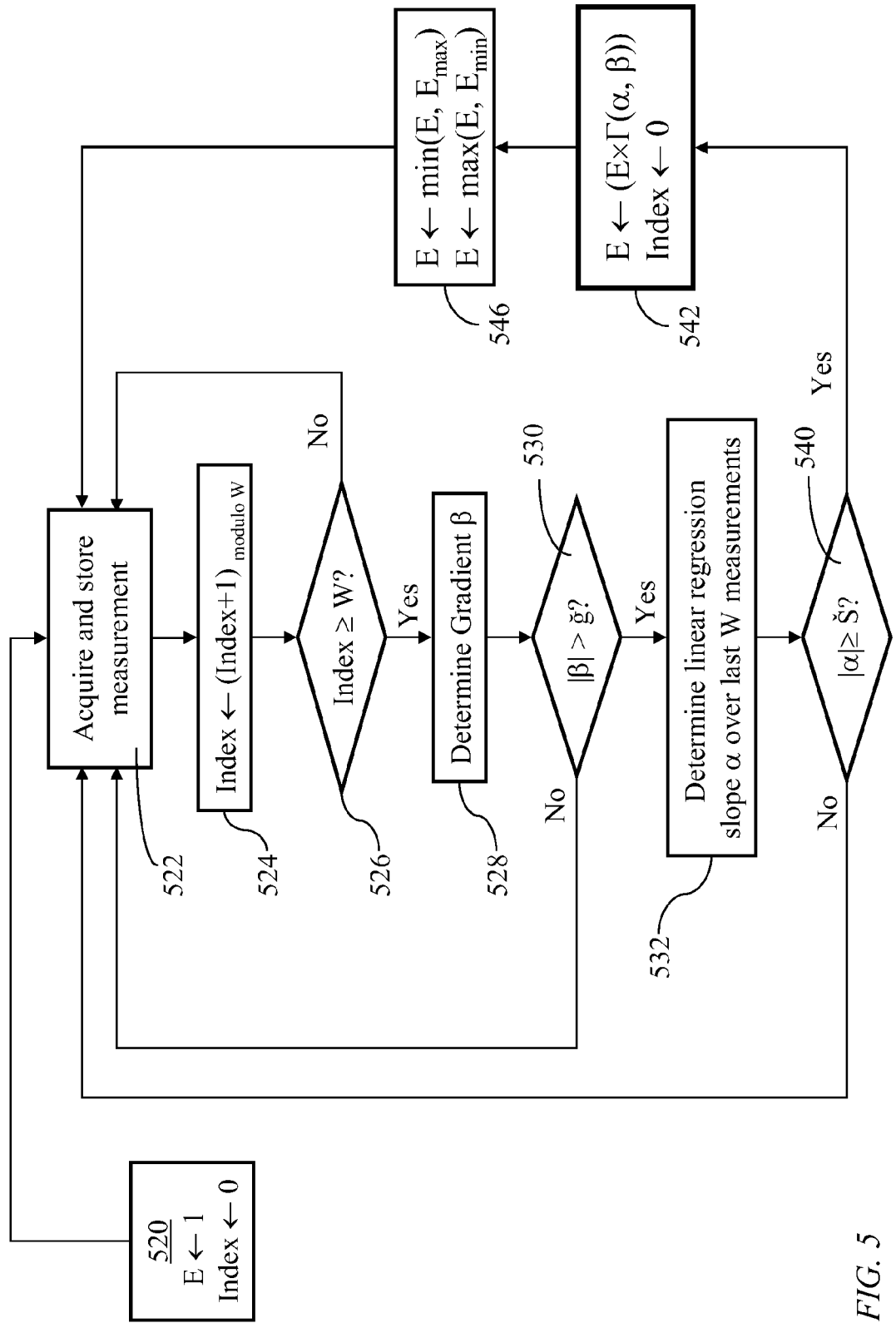
FIG. 5 is a flow chart illustrating a method of determining an encoding coefficient based on measurements variation within a time window in accordance with an embodiment of the present invention.

FIG. 5 illustrates basic steps for determining a preferred current value of an encoding coefficient. In step 520, the encoding coefficient E is set to equal 1.0, i.e., the encoding rate is the nominal encoding rate determined when the connection is setup. It is noted that the encoder naturally produces data at rates which vary according to the nature of the encoded signal. The encoding coefficient E, however, causes the encoder to independently modify its output flow rate regardless of the dynamics (the fluctuating bit rate) of the encoded signal. An index of the circular buffer 320 (FIG. 3) is also initialized in step 520 to zero (or to any preset value not exceeding the buffer length). In step 522, the flow controller 246 acquires control data sent by sink reporter 242, extracts connection measurements from the control packets, and stores the measurements in address "Index" of a circular buffer, after which the Index is increased by 1 in step 524. If the address Index reaches W, the address Index is reset to 0. If step 526 determines that the value of Index is smaller than a window width W, step 522 is revisited to receive and process a new measurement (scalar measurement) or a set of concurrent measurements (a vector measurement). The window width may be expressed as a number of buffer records each record holding a scalar measurement or a vector measurement. If step 526 determines that the value of Index is at least equal to the window width W, step 528 determines a gradient, denoted β, over a short period preceding the end of a window. If the magnitude of the gradient β is less than a first predefined threshold ğ, the encoding coefficient is not updated and step 522 is revisited. Otherwise, step 532 determines a trend of the most recent W measurements using linear-regression techniques. In step 540, the magnitude of the slope, denoted α, of the regression line is compared with a second predefined threshold Š. If the magnitude of α (denoted |α|) is less than Š, step 522 is revisited to acquire and store a scalar measurement or a vector measurement from a new control packet received at the flow controller. Otherwise, if |α|≧Š step 542 determines a new encoding coefficient E according to a predefined function Γ(α, β) and resets Index to 0. Step 546 ensures that the value of E is bounded to be above a predefined minimum value $E_{min}$ and below a predefined maximum value $E_{max}$.

The value of E may exceed a preset design upper bound $E_{max}$ if function Γ(α,β) allows the value of E to increase continually when measurements indicate high connection transmittance. Step 546 then reduces value of E to $E_{max}$ (E←min(E, $E_{max}$).

Reducing the encoding rate below a certain value may result The value of E may fall below a preset design lower bound $E_{min}$ if function Γ(α,β) allows the value of E to decrease continually when measurements indicate low connection transmittance. Step 546 then increases value of E to $E_{min}$ (E←max(E, $E_{min}$).

It is noted that with negligible variations in connection transmittance, as deduced from small values of the magnitudes of β and α, step 542 may not be activated over a considerable period of time. However, in a circular buffer 320, a new measurement overwrites an already processed previous measurement and the slope α of the regression line is determined in step 532 over the most recent W scalar measurements (or W vector measurements).

The steps of FIG. 5 are implemented by a processor associated with flow controller 246 according to computer-readable instructions stored in a storage medium.

Figure 6:
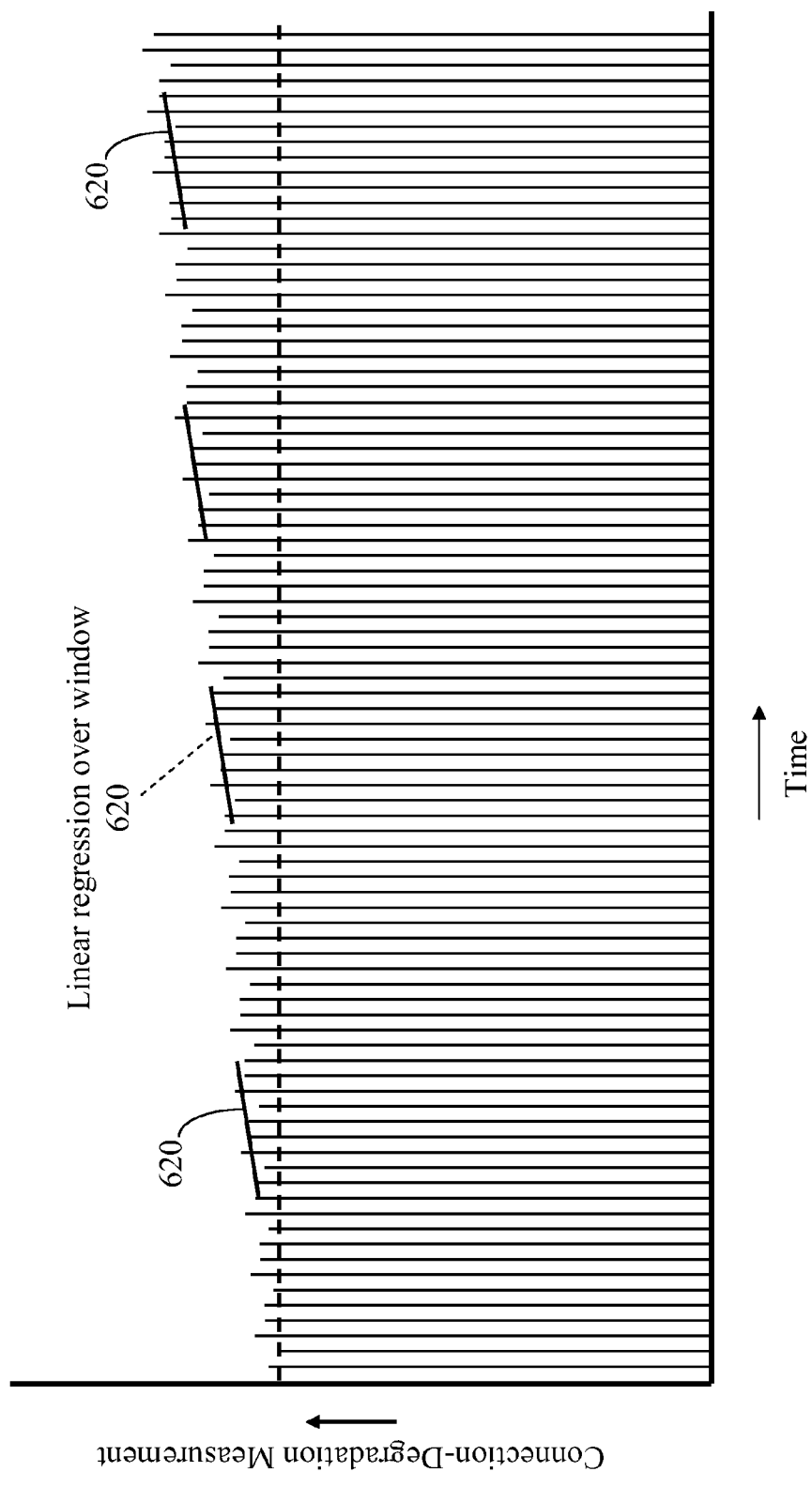
FIG. 6 illustrates exemplary regression lines of successive measurements during time windows, where the slopes of the regression lines are used in the method of FIG. 5 to determine preferred values of the encoding rate in accordance with an embodiment of the present invention.

FIG. 6 illustrates a succession of measurements of connection characteristics such as delay, data-loss proportion, or buffer occupancy at a client 160. The slopes of regression lines 620 are positive, indicating a deteriorating connection conditions (decreasing connection transmittance) and, hence, a need to reduce the flow rate by reducing the encoding rate, i.e., reducing the encoding coefficient E.

Figure 7:
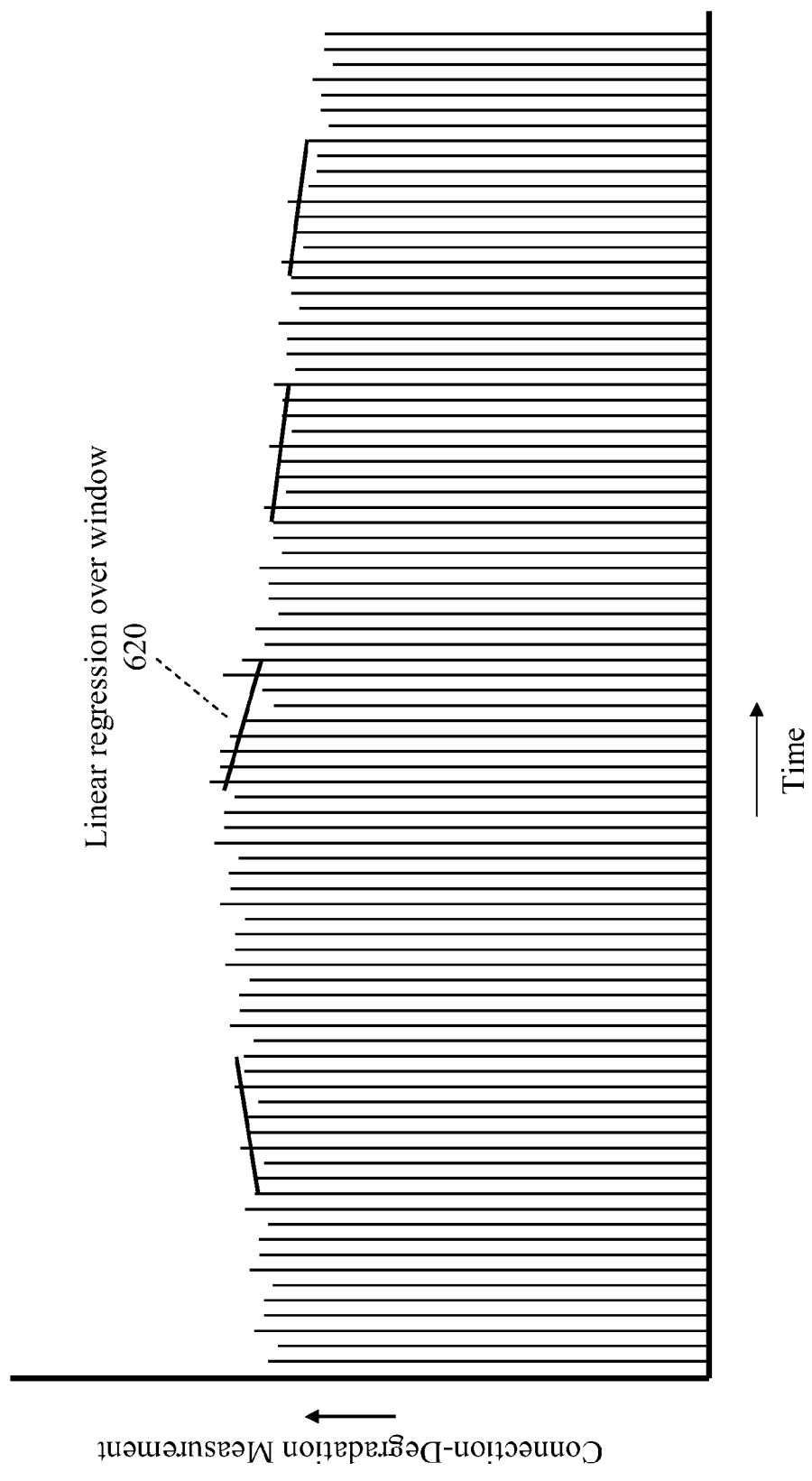
FIG. 7 illustrates another set of exemplary regression lines with both positive and negative slopes for use in an embodiment of the present invention.

FIG. 7 illustrates a succession of measurements of connection characteristics at the client 160. The slopes of regression lines 620 change from a positive value to negative values indicating deterioration followed by improvement of connection condition.

Figure 8:
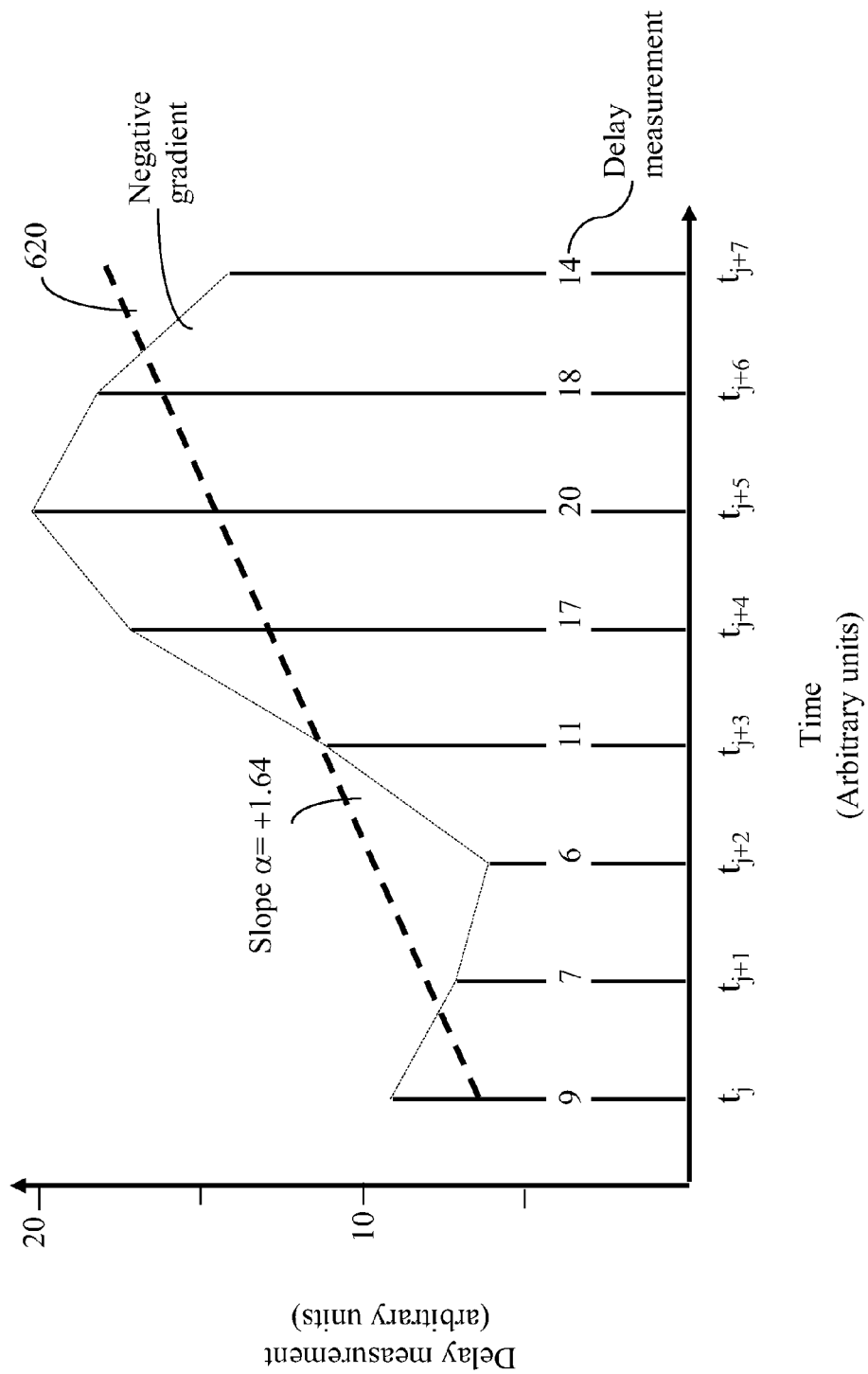
FIG. 8 exemplifies measurements over a time window yielding a regression line of positive slope and a negative gradient for illustrating the method of FIG. 5.

FIG. 8 illustrates eight scalar measurements over a window 420 of FIG. 4. A regression line 620 selected to minimize the sum of squares of deviations from measurements, taken at time instants $t_j$, $t_{j+1}$, $t_{j+7}$, has a slope α=1.64. The gradient β determined from the last two measurements is negative. The value of E is determined from a predefined function Γ(α,β). An exemplary function Γ(α,β), represented in a tabular form, is illustrated in FIG. 10.

Figure 9:
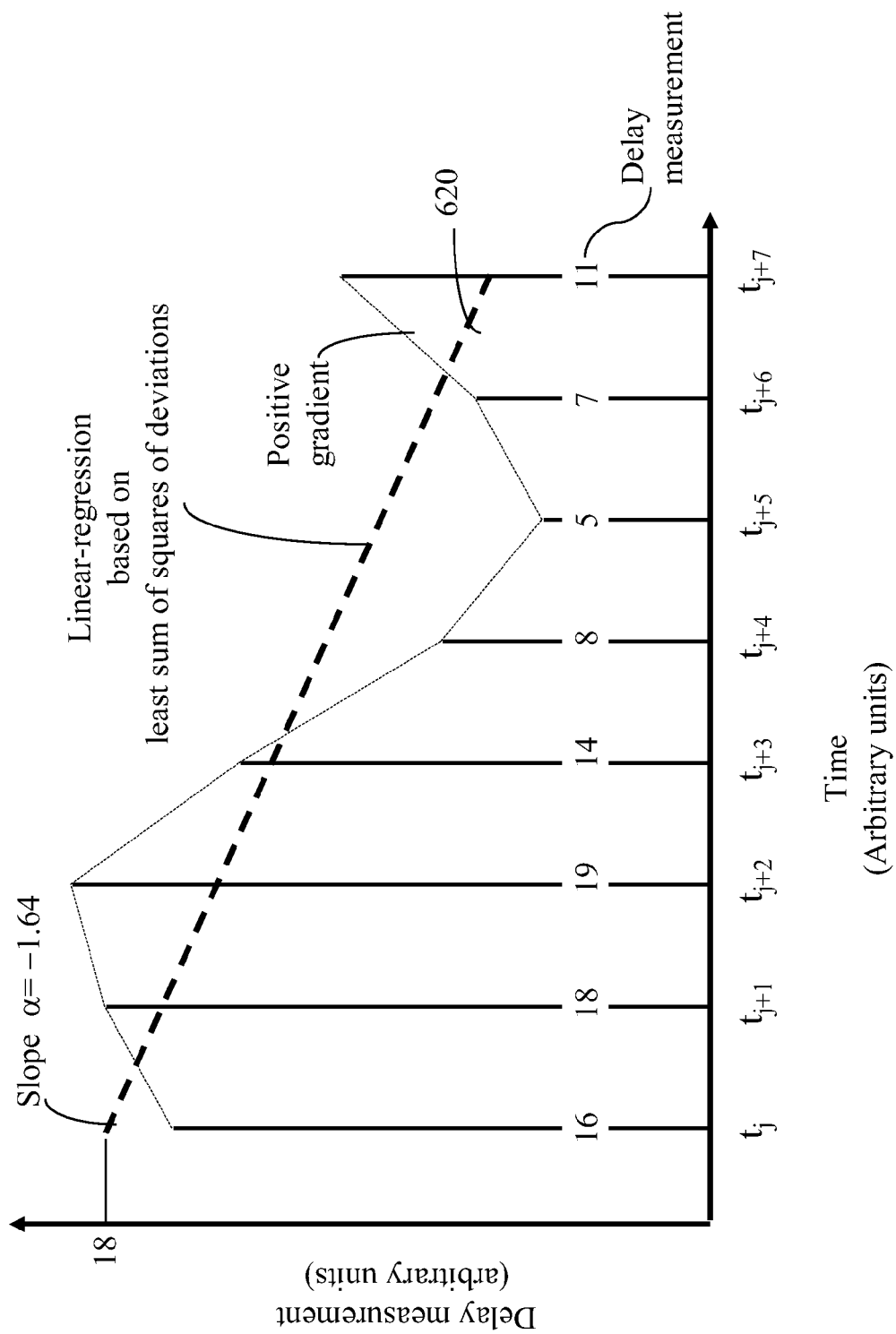
FIG. 9 exemplifies measurements over a time window yielding a regression line of negative slope and a positive gradient for illustrating the method of FIG. 5.

FIG. 9 illustrates eight scalar measurement over a window where a regression line has a slope α=−1.64. The gradient β determined from the last two measurements is positive. The value of E determined from predefined function Γ(α,β).

Figure 10:
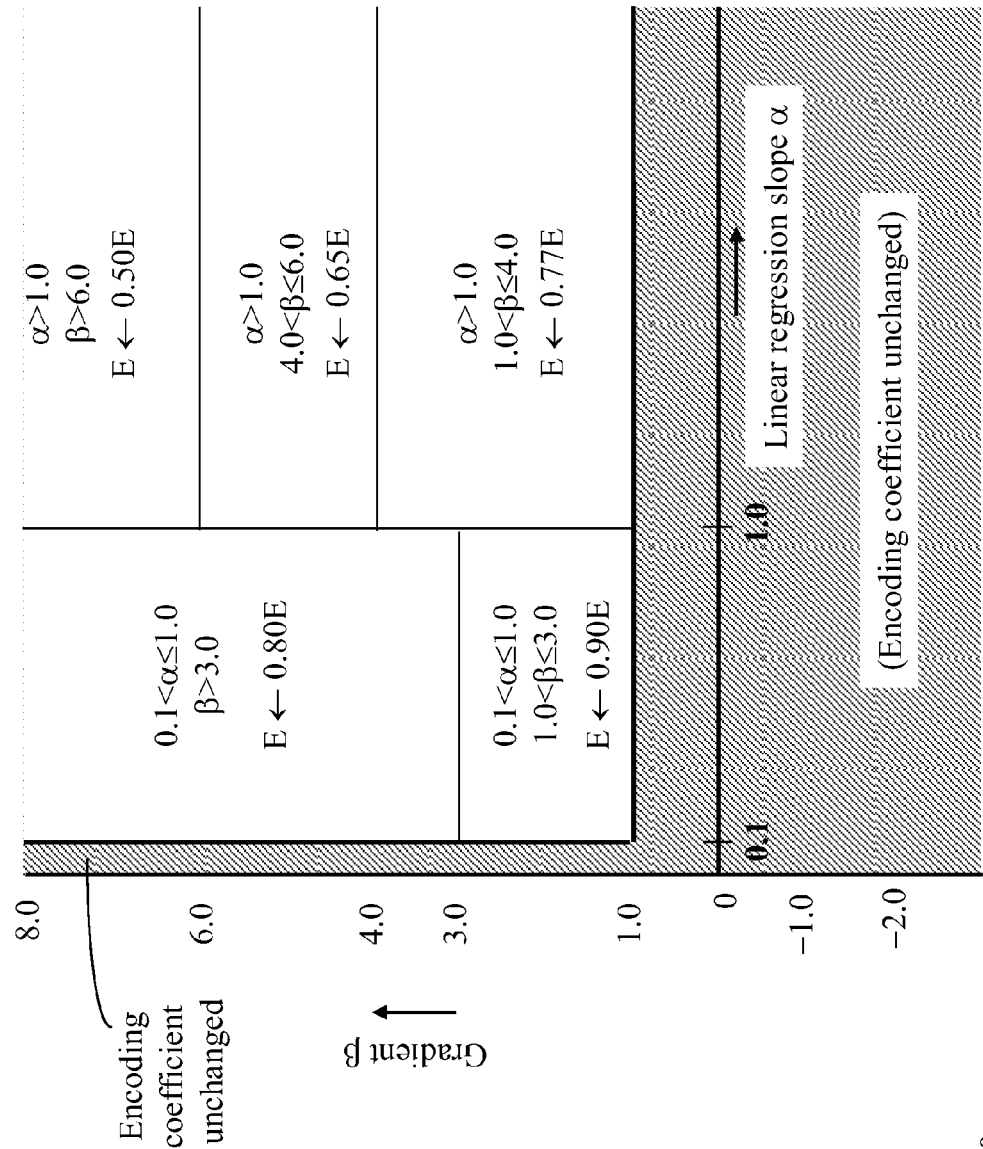
FIG. 10 illustrates the method of FIG. 5 where decrements of the encoding coefficient take place in discrete steps determined according to domains defined by both linear-regression slope and measurement gradient at window end, in accordance with an embodiment of the present invention.

FIG. 10 illustrates an exemplary function Γ(α,β) for positive values of the slope a of a regression line. As indicated, the encoding coefficient E remains unchanged if the gradient β is less than 1.0 with α≧0 or if the gradient β is greater than or equal to 1 but α is less than 0.1. The measurements of FIG. 8 yield a positive regression-line slope α and a negative gradient β. Hence, according to function Γ(α,β) of FIG. 10, the encoding coefficient E remains unchanged.

Figure 11:
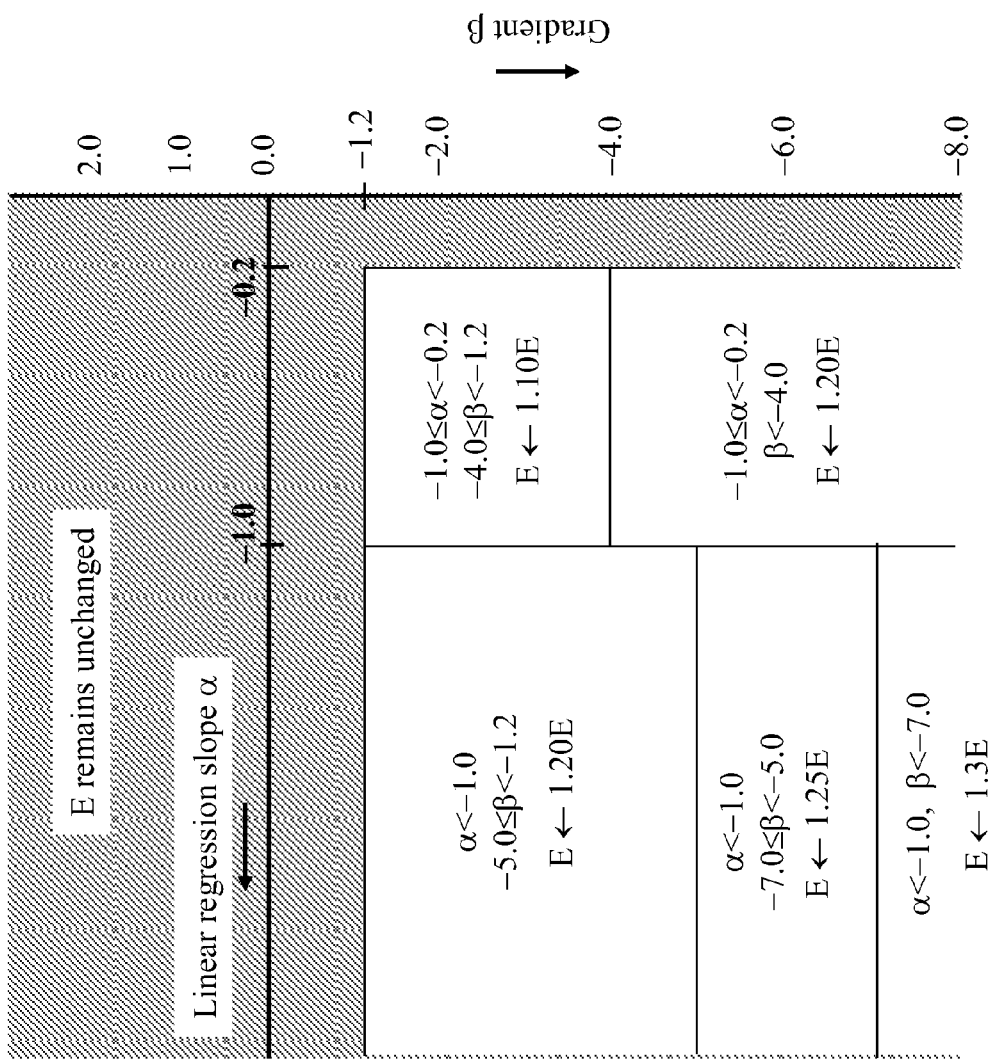
FIG. 11 illustrates the method of FIG. 5 where increments of the encoding coefficient take place in discrete steps determined according to domains defined by both linear-regression slope and measurement gradient at window end, in accordance with an embodiment of the present invention.

Likewise, FIG. 11 illustrates the exemplary function Γ(α, β) for negative values of α. The value of E remains unchanged if β≧(−1.2) or if β<(−1.2) but α>(−0.2). The measurements of FIG. 9 yield a negative regression-line slope α and a positive gradient β. Hence, according to function Γ(α,β) of FIG. 11, the encoding coefficient E remains unchanged.

FIG. 12, comprising FIG. 12A and FIG. 12B, illustrate a process of exchanging control packets between the streaming server 120 and a client 160 using a known protocol. FIG. 12A illustrates a process of sending an RTP (Real-time transport protocol) control packet to a client 160 and FIG. 12B illustrates a process of receiving an RTCP (Real-time control transport protocol) packet from the client 160 and processing the content of the RTCP packet in flow controller 246. The process of FIG. 12A starts at step 1220 where the source reporter 228 (FIG. 2) prepares the RTP control packet. In step 1222 a current value of the encoding coefficient is determined. In step 1224 a sequence number of the RTP packet and a time of transmitting the RTP packet are recorded. In step 1226 the RTP packet is transmitted to a respective client 160.

The process of FIG. 12B starts at step 1240, where the flow controller 246 (FIG. 2) receives the RTCP packet from sink reporter 242. In step 1242 measurement data is extracted from the RTCP packet. In step 1244, a difference between a current time instant and a time instant of a preceding update of the encoding coefficient is determined. If the time difference is less than a predefined minimum update interval, step 1240 is revisited to consider a waiting or forthcoming RTCP packet. Otherwise, if the time difference equals or exceeds the minimum update interval, step 1246 determines a new permissible encoding rate. Step 1248 whether an update of the encoding coefficient is needed. If so, a new encoding coefficient is determined. Otherwise step 1240 is revisited. In step 1260, the encoding coefficient is updated and communicated to the encoder 220, and the flow controller 246 (FIG. 2) is ready to consider a new RTCP packet (step 1240).

Figure 13:
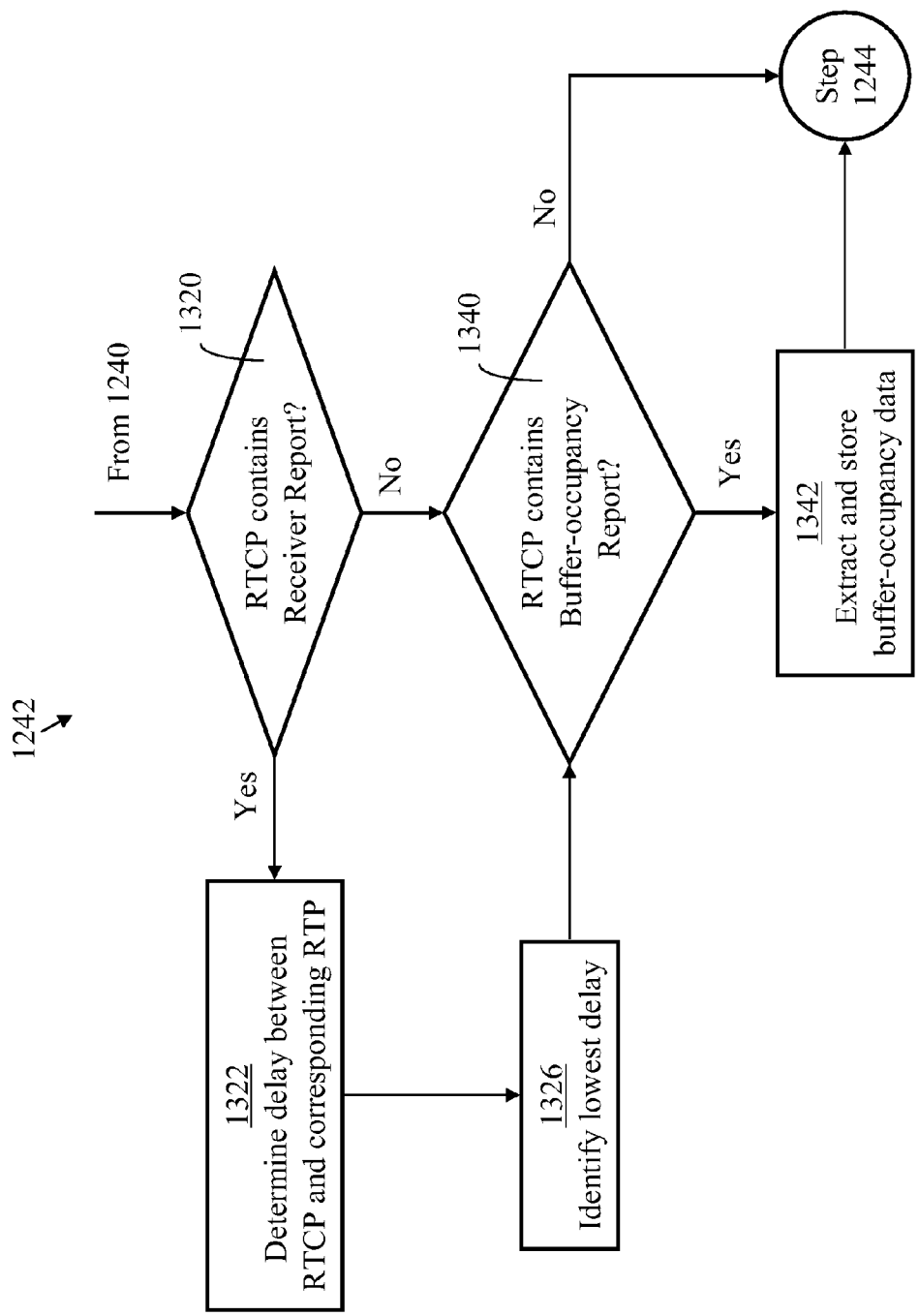
FIG. 13 is a flow chart illustrating processes of determining connection performance measurements based on RTP packets sent by an encoder and RTCP packets received from a decoder in accordance with an embodiment of the present invention.
Figure 14:
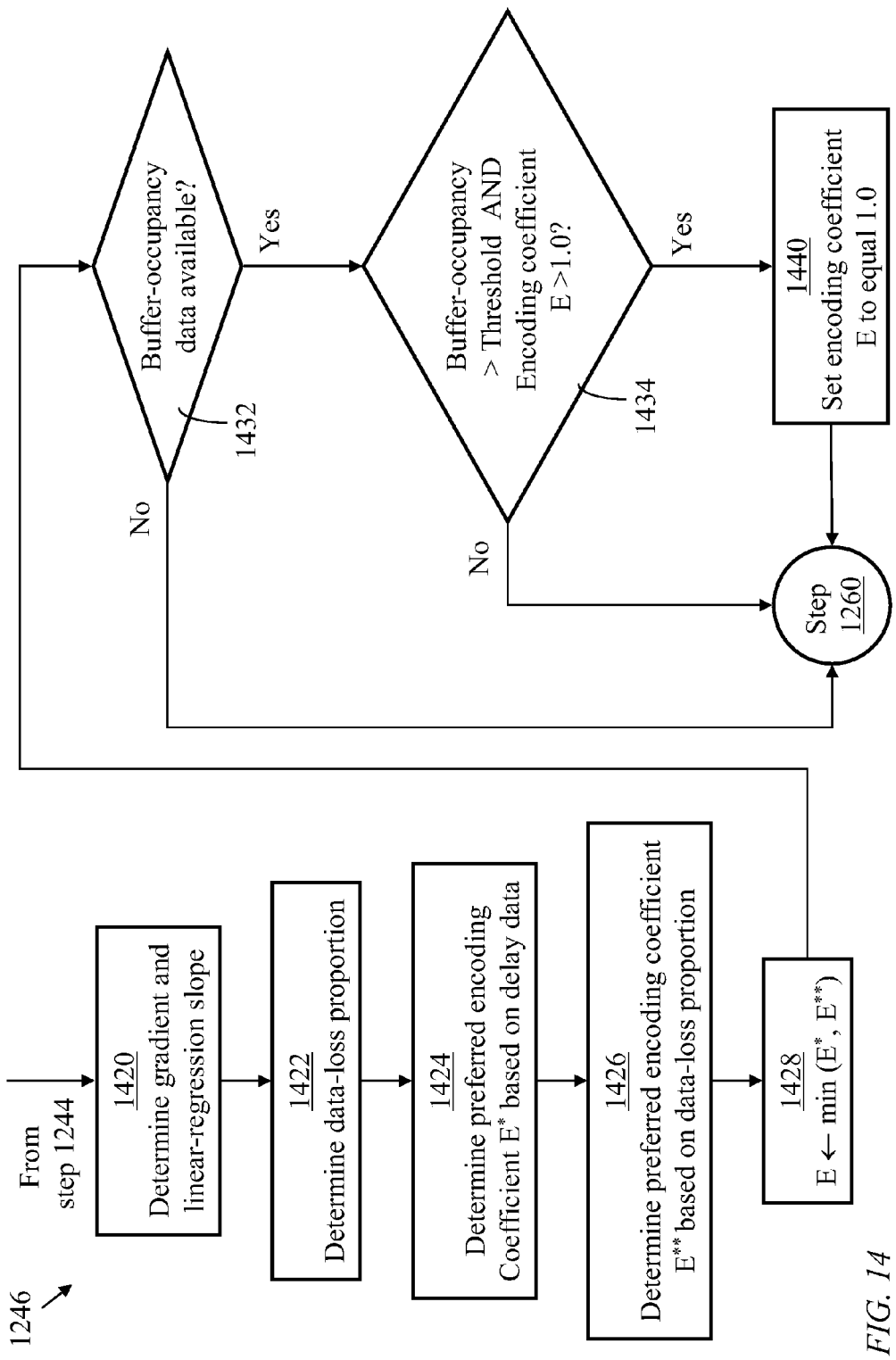
FIG. 14 is a flow chart indicating steps of determining connection metrics and a corresponding encoding coefficient in accordance with an embodiment of the present invention.

The steps of FIG. 12, further detailed in FIG. 13 and FIG. 14, are implemented by the aforementioned processor associated with flow controller 246 according to computer-readable instructions stored in a storage medium.

FIG. 13 details step 1242 of FIG. 12. In step 1320, a received RTCP packet is examined to determine if it contains a "receiver report" from the sink reporter 242. If the RTCP packet does not contain a receiver report, step 1340 is implemented to determine if the RTCP packet contains a buffer-occupancy report. If the RTCP packet contains a receiver report, step 1322 determines a transfer-delay as a time difference between the current time of arrival of the RTCP packet and the time of transmitting a corresponding RTP packet. The corresponding RTP packet is the RTP packet having a sequential number which matches a number indicated in field "extended highest sequence number received" of the RTCP receiver report. In step 1326, a minimum transfer delay is determined as the lesser of the transfer delay calculated in step 1322 and a previous value of the minimum transfer delay for the connection. The minimum transfer delay is initialized as an arbitrary large value. The minimum transfer delay is retained for future use as a reference for gauging fluctuating transfer delay.

FIG. 14 is a flow chart presenting an overview of steps of determining connection metrics and a corresponding encoding coefficient. In step 1420, the slope of a regression line of performance measurements taken over a time window is computed using any of known analytical methods. The gradient of the measurements near the end of the time window is also determined. In step 1422 a statistic of data-loss over the time window is also determined. In step 1424, a preferred value of the encoding coefficient, denoted E*, based on the regression-line slope and the gradient, is determined as described above with reference to FIGS. 10 and 11. In step 1426, a preferred value of the encoding coefficient, denoted E, is determined according to the data-loss statistic determined in step 1422. In step 1428**, a new encoding coefficient E is selected as the lesser of E* and E**. It is noted that under favorable connection conditions, the preferred encoding coefficient may be allowed to exceed 1.0, i.e., the encoder may produce a stream momentarily having a flow rate (bit-rate) exceeding the nominal flow rate assigned to the connection.

The encoding coefficient E just determined may be further modified according to occupancy of a buffer placed at the client-end of the connection. Step 1432 directs the process to step 1260 (FIG. 12) if buffer-occupancy data is not available. Otherwise, step 1434 determines if a statistic of buffer-occupancy measurements taken over the time window exceeds a predefined threshold. If so, and if the encoding coefficient determined step 1428 exceeds 1.0, the preferred encoding coefficient is reduced to one in step 1440 and the process returns to step 1260 of FIG. 12. It is noted that steps 1434 and 1440 follow an exemplary rule. Other rules governing the use of buffer-occupancy statistics may be devised.

Figure 15:
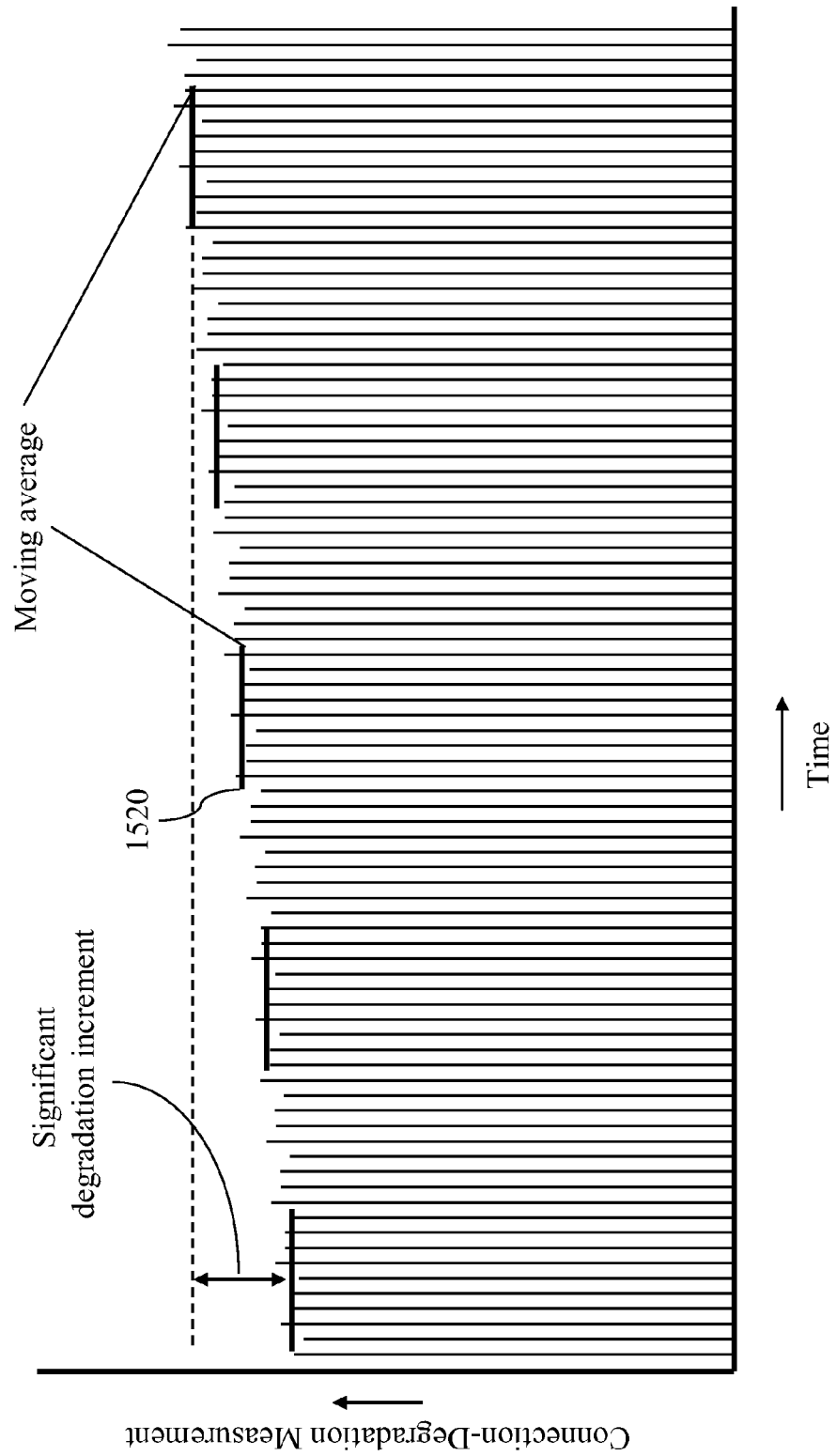
FIG. 15 illustrates an alternative method of treating measurements taken over disjoint or overlapping time windows for determining an encoding coefficient in accordance with an embodiment of the present invention.

FIG. 15 illustrates a method of processing connection measurements, according to another embodiment, where the mean values of measurements, over successive or overlapping windows, are used to determine a new value of the encoding coefficient E. A statistic based on a mean value of measurements taken over a time window 1520 and corresponding to a specific connection characteristic, such as transfer delay or data-loss, is compared with a predefined acceptable reference value of the specific connection characteristic. When the statistic exceeds the reference value by a significant amount, the encoding coefficient is reduced and, consequently, the encoding rate is decreased below the nominal flow rate. If the statistic is below the reference value by a significant amount, the encoding coefficient may be increased. Thus, two bounds $\mu_1$ and $\mu_2$, $\mu_1 \leq \mu_2$, corresponding to the specific characteristic, may be defined. The encoding coefficient is increased when the statistic is below $\mu_1$ and decreased when the statistic exceeds $\mu_2$. The selection of the gap ($\mu_2 - \mu_1$) is critical. A very small gap may result in unnecessary rapid flapping between low values and higher values. A very large gap may result in slow response, or even no response, to significant connection-condition variations.

Figure 16:
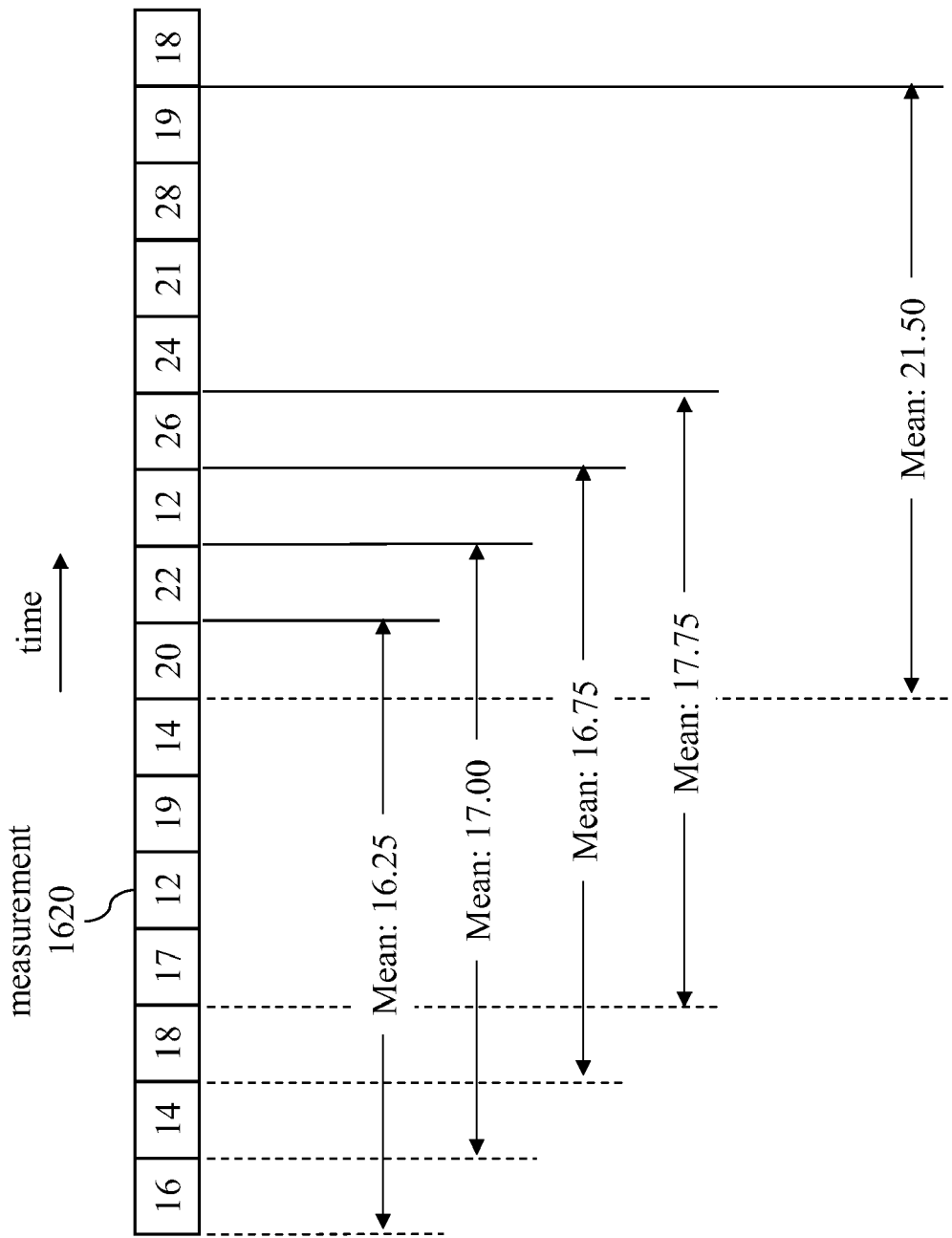
FIG. 16 illustrates computation of moving-average value of measurements over overlapping time windows for use in an embodiment of the present invention.

FIG. 16 illustrates a moving average defined as a mean value of scalar measurements, expressed in arbitrary units, taken over successive overlapping windows each window covering eight measurements. The mean values 16.25, 17.0, 16.75, and 17.75 for the first four overlapping windows exhibit slow variation and a current value of the encoding coefficient may remain unchanged. However, a mean value of 21.5 determined after a number of measurements, as indicated in FIG. 16, may trigger modification of the encoding coefficient and adjusting parameters of the adaptable encoder 220. As described earlier with reference to FIG. 4, metrics determined at the end of a time window determine the selection of a subsequent time window.

Figure 17:
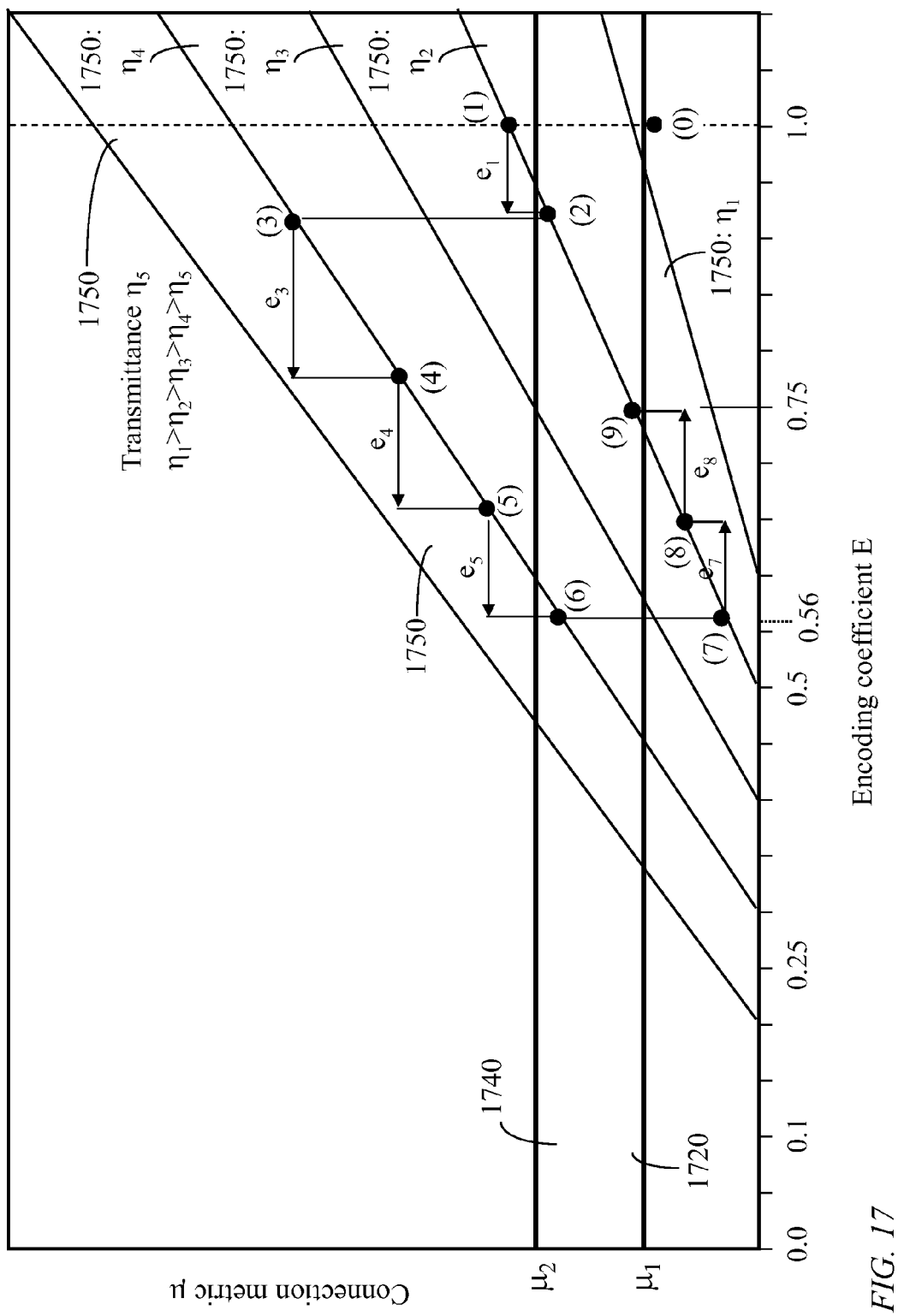
FIG. 17 illustrates a method of determining a preferred encoding coefficient based on comparing connection metrics with predefined bounds in accordance with an embodiment of the present invention.

FIG. 17 illustrates a method of attuning the encoding coefficient E to a current value of a metric $\mu$ of the time-varying connection 260. At a given connection condition, the value of metric $\mu$ increases as the encoding coefficient E increases. The two bounds $\mu_1$ and $\mu_2$, indicated in FIG. 17 as lines 1720 and 1740 respectively, define a range of acceptable connection performance. FIG. 17 illustrates exemplary dependence of the metric $\mu$ on the encoding coefficient E for five values of connection transmittance, denoted $\eta_1$, $\eta_2$, $\eta_3$, $\eta_4$, and $\eta_5$, where $\eta_1 > \eta_2 > \eta_3 > \eta_4 > \eta_5$. Initially, E is set to equal 1 so that the encoder operates at the nominal encoding rate allocated to a client under consideration. The nominal encoding rate is selected so that the connection performance is acceptable under normal connection condition, where the transmittance equals $\eta_1$. In FIG. 17, sample values of the connection metric $\mu$ are identified by indices (0) to (9). Consider a case where the transmittance is at its maximum value $\eta_1$, when E=1.0, and a current metric has a value {index (0)}, between $\mu_1$ and $\mu_2$. The connection condition then deteriorates and the transmittance of the connection decreases to a value $\eta_2$ leading to a new value of metric $\mu$ above the upper bound $\mu_2$ {index (1)}. The flow controller 246 decreases the encoding coefficient E by a value of $e_1$, leading to a new value {index (2)} of metric $\mu$ within the interval ($\mu_1, \mu_2$). The connection condition continues to deteriorate and the connection transmittances decreases to $\eta_1 < \eta_2$, leading to a new value {index (3)} of metric $\mu$ well above the interval ($\mu_1, \mu_2$). In response to the increased metric, the flow controller 246 reduces the encoding coefficient by $e_3$. The value of the metric $\mu$ drops {index (4)} but is still above $\mu_2$. After two further reductions of the encoding coefficient by $e_4$ and $e_5$, leading to values represented by indices (5) and (6), the encoding coefficient is approximately 0.56 and the metric $\mu$ reduces to a value {index (6)} within the interval ($\mu_1, \mu_2$). The connection conditions then improved so that, at the same value 0.56 of the encoding coefficient E, the metric $\mu$ drops to a value {index (7)} well below the interval ($\mu_1, \mu_2$). The flow controller 246 increases the encoding coefficient by $e_7$ leading to an increased value of μ {index (8)} which is still below $\mu_1$. The flow controller 246 further increases the encoding coefficient by $e_8$ to a value of 0.75 leading to an increased value {index (9)} of μ within the interval $(\mu_1, \mu_2)$. The encoding coefficient E remains at the value of 0.75 until further changes in connection transmittance causes metric changes.

Figure 18:
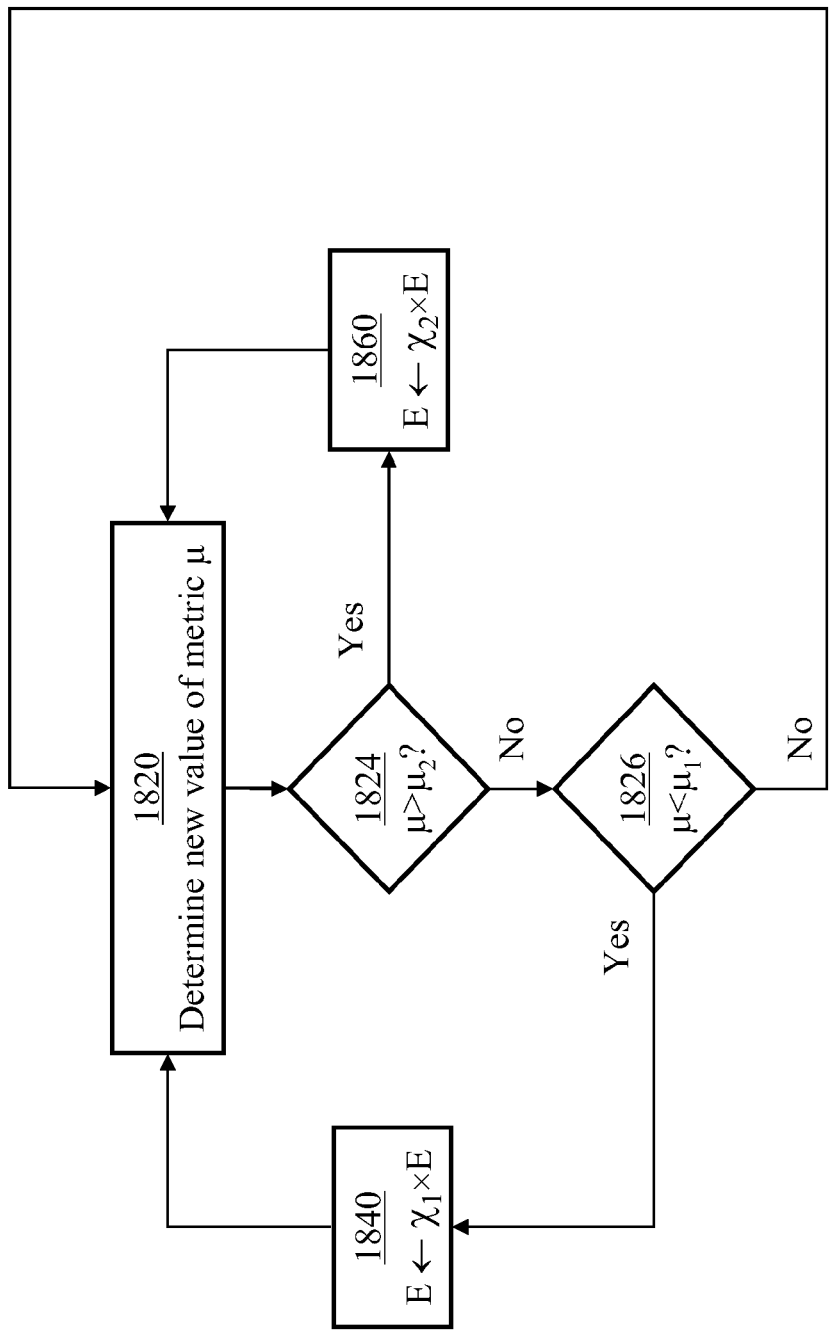
FIG. 18 is a flow chart illustrating basic steps of the method of FIG. 17, in accordance with an embodiment of the present invention.

FIG. 18 is a flow chart of the main steps, initially starting from step 1820, of the procedure of FIG. 17. In step 1820, a new value of metric μ is determined from measurements taken over a window as described above with reference to FIGS. 15 and 16. In step 1824, the new value is compared with the upper bound $\mu_2$ and if $\mu > \mu_2$ the encoding coefficient is reduced in step 1860 by multiplying a current value of E with a factor $\chi_2 < 1$ and the process returns to step 1820. If $\mu \leq \mu_2$, step 1826 compares the new value of metric μ with the lower bound $\mu_1$ of the acceptance interval $(\mu_1, \mu_2)$. If $\mu \geq \mu_1$, it is determined that the new value of the metric is within the acceptance interval $(\mu_1, \mu_2)$ and the process returns to step 1820 to process a new value of metric μ. If $\mu < \mu_1$, the encoding coefficient E is updated in step 1840 by multiplying a current value of E by a factor $\chi_1 > 1$ and the process returns to step 1820. The factors $\chi_1$ and $\chi_2$, $(\chi_1 > 1, \chi_2 < 1)$ may depend on the differences $(\mu_1 - \mu)$ and $(\mu_2 - \mu)$, respectively. If the product $(\chi_1 \times \chi_2)$ is less than 1, the value of E increases in relatively small steps, when $\mu < \mu_1$, and decreases in relatively large steps, E when $\mu > \mu_2$.

Figure 19:
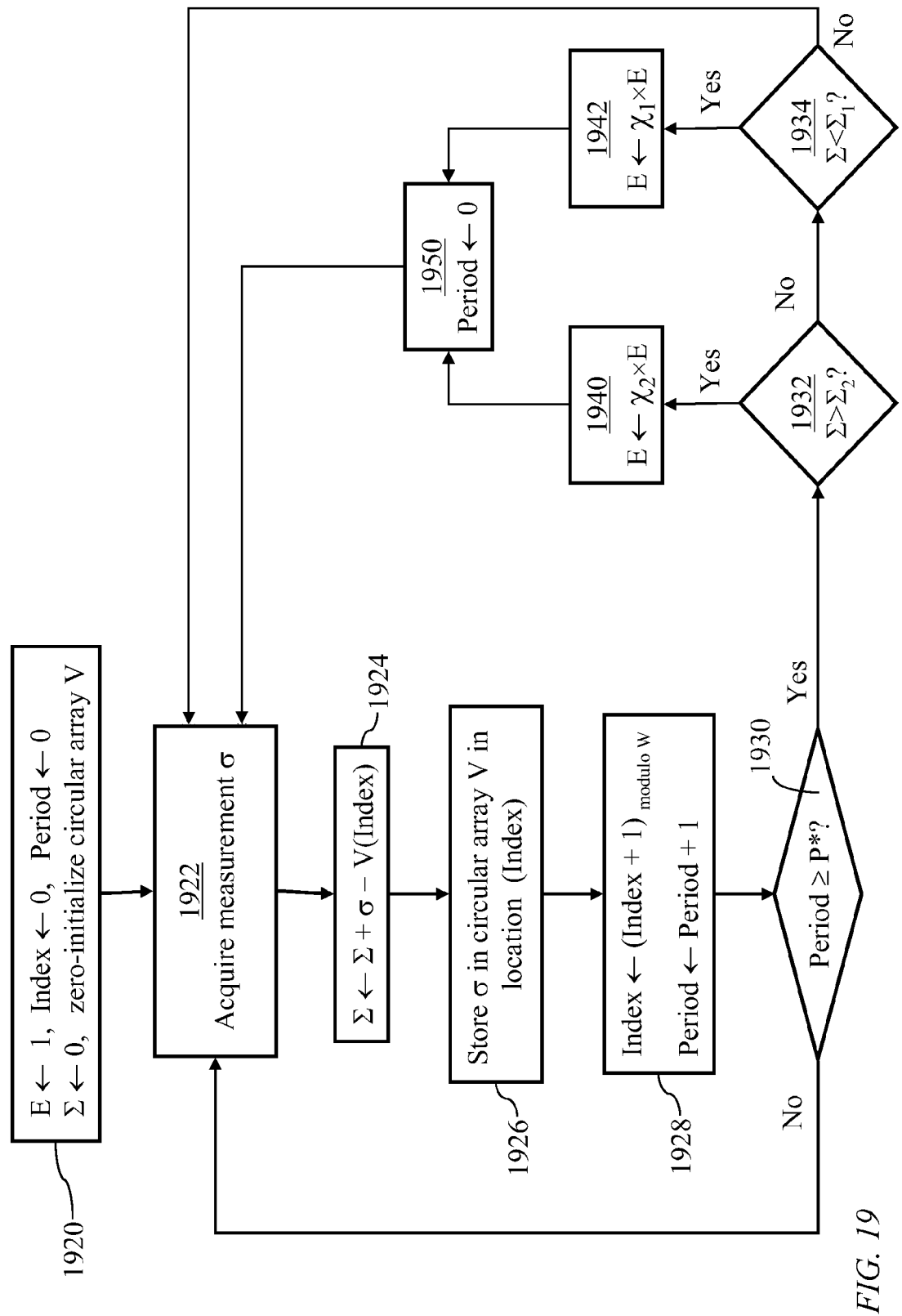
FIG. 19 is a flow chart providing details of the steps of the method of FIG. 17, including further steps of minimizing computation effort in accordance with an embodiment of the present invention.

FIG. 19 depicts the process of FIG. 17 in further detail. The metric μ is selected to be a mean value of measurements taken over a window covering a predefined number of measurements. To reduce the computational effort of the flow controller 246, the mean value is replaced by the sum Σ of measurements over the window and the acceptance interval $(\mu_1, \mu_2)$ is replaced by an interval $(\Sigma_1, \Sigma_2)$, where $\Sigma_1 = w \times \mu_1$ and $\Sigma_2 = w \times \mu_2$, w being a number of measurements per time window.

In step 1920, the value of E is initialized at 1, i.e., the encoder is initially requested to operate at the nominal encoding rate assigned to a client under consideration. All the entries of a circular array V (representing circular buffer 320 of FIG. 3) of length w are set to equal zero and a sum Σ of w entries in array V is initialized to equal zero. An integer "Index" tracks a current location in array V and an integer "Period" tracks a most recent instance of encoding-coefficient update. Each of the two integers Index and Period is initialized in step 1920 to equal zero.

In step 1922 a measurement σ is extracted from a control packet received at flow controller 246. In step 1924 the summation Σ, proportional to the metric μ, is updated by subtracting an entry in location "Index" of array V and adding the new measurement σ. Array V is circular and, hence, after a first time window, the subtracted entry in location Index represents a measurement taken before a current window. After a first time window, the summation Σ over the first window correctly represents the metric μ multiplied by w.

In step 1926, a new measurement σ is written in location "Index" of array V. In step 1928, the integer Period is increased by 1, and the current location Index of circular array V is increased by 1, modulo w, i.e., when the value of Index reaches w, Index is reset to zero. If, in step 1930, it is determined that the number of measurements since an immediately preceding instance of encoding-coefficient update is less than a predefined limit P*, the process returns to step 1922 to process a new measurement. Otherwise the process proceeds to step 1932. When step 1932 is reached, the circular array V has w most recent measurements and the time interval between a current instant of a time and the immediately preceding instant of time at which the encoding coefficient E was modified is at least equal to a threshold P*. The value of P* is selected to be sufficiently large to avoid an excessive update rate and small enough to be responsive to connection state variations. The value of P* is a design parameter set by a designer of the flow controller 246.

Step 1932 compares the current summation Σ with the upper bound $\Sigma_2$ of the acceptance summation interval $(\Sigma_1, \Sigma_2)$. If $\Sigma > \Sigma_2$, E is reduced in step 1940 by multiplying its current value by a factor $\chi_2 < 1$, the integer Period is reset to equal zero in step 1950, and the process returns to step 1922. If $\Sigma \leq \Sigma_2$, step 1934 compares the current summation Σ with the lower bound $\Sigma_1$ of the acceptance summation interval $(\Sigma_1, \Sigma_2)$. If $\Sigma < \Sigma_1$, E is increased in step 1942 by multiplying its current value by a factor $\chi_1 > 1$, the integer Period is reset to equal zero in step 1950 and the process returns to step 1922. If step 1934 determines that $\Sigma \geq \Sigma_1$, it is concluded that the current summation Σ is within the acceptance summation interval $(\Sigma_1, \Sigma_2)$. The process returns to step 1922 and the value of E remains unchanged.

The steps of FIG. 19 are implemented by the aforementioned processor associated with flow controller 246 according to computer-readable instructions stored in a respective computer readable storage medium.

Multiple Connection Metrics

The metric μ considered in FIG. 17 is a scalar representing one of multiple aspects of connection performance, such as transfer delay, data loss proportion, or buffer occupancy at a decoder 240. Consequently, the bounds $\mu_1$ and $\mu_2$ are also scalars. The criterion for modifying the encoding coefficient may be based on a connection metric related to one performance aspect with the factors $\chi_1$ and $\chi_2$, which modify the encoding coefficient (FIGS. 18 and 19), being a function of a deviation of a current value of a metric from an acceptance range of the same metric. To take multiple aspects of connection performance into account, the corresponding metrics may be normalized and a composite metric may be defined as a weighted sum of multiple normalized metrics with the bounds $\mu_1$ and $\mu_2$ selected accordingly. For example, a delay metric may be normalized with respect some nominal delay value, such as an estimated minimum delay for the connection under consideration, thus becoming dimensionless. A data-loss metric, which is naturally dimensionless, may be used as a normalized metric, and a buffer-occupancy metric (which is also dimensionless) may be normalized with respect to the capacity of a respective buffer. Consider, for example, contemporaneous measurements of delay, data-loss proportion, and buffer occupancy of 20 milliseconds, 0.02, and 200, respectively. The delay metric of 20 milliseconds may be normalized to a value of 2.0 based on a nominal (reference) delay of 10 milliseconds, and the buffer occupancy of 200 data units may be normalized to 0.8 based on a buffer capacity of 250 data units. A composite metric μ* may be defined as $\mu^* = \mu_{delay} + a \times \mu_{loss} + b \times \mu_{buffer}$ where $\mu_{delay}$, $\mu_{loss}$, and $\mu_{buffer}$ denote a normalized delay-based metric, a data-loss metric, and a normalized buffer occupancy metric, respectively. Selecting the parameters a and b as 80.0 and 2.5, respectively, the composite metric μ* for the metrics of the above example is determined as $\mu^* = 2.0 + 80.0 \times 0.02 + 2.5 \times 0.8 = 5.6$.

A more thorough method of considering multiple aspects of connection performance is to derive a separate metric and specify a separate acceptance interval for each performance aspect. When any current metric of a set of current metrics is above its acceptance interval, the encoding coefficient E is decreased. New metrics determined in a subsequent time window would be influenced by the change in encoding rate, due to change in the encoding coefficient E, and any change in connection transmittance. The encoding coefficient E may be decreased again until none of the new metrics is above its respective acceptance interval. In contrast, the encoding coefficient E may be increased only when all current metrics are below their respective acceptance intervals. E remains unchanged when at least one of the resulting new metrics is within its acceptance interval while none of remaining new metrics is above its acceptance interval.

Figure 20:
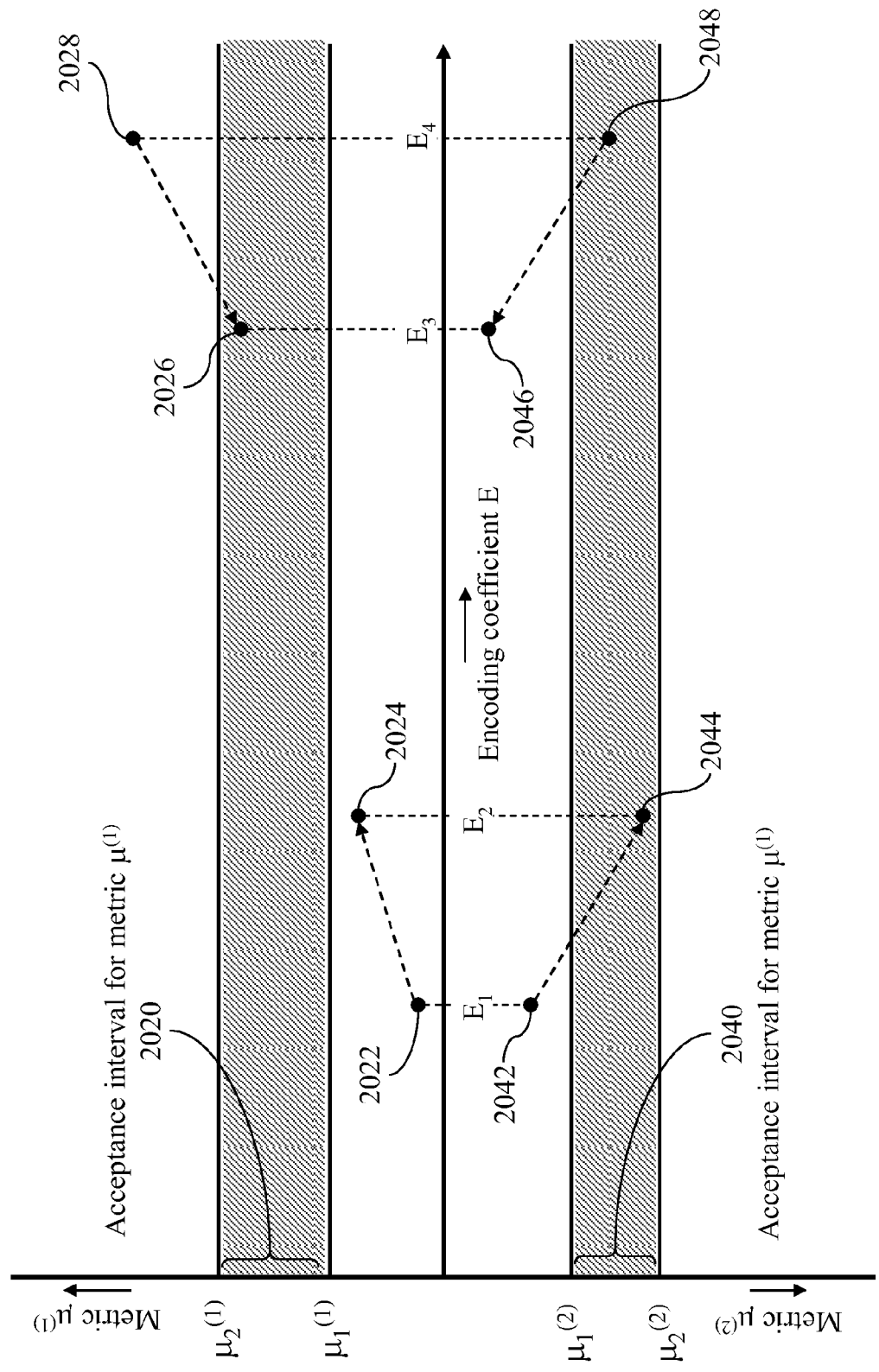
FIG. 20 illustrates an extension of the process described with reference to FIG. 17 for adjusting an encoding coefficient according to current values of two metrics.

FIG. 20 illustrates the method of encoding-coefficient E adjustment, described above, according to current values of two metrics $\mu^{(1)}$ and $\mu^{(2)}$. In FIG. 20, $\mu^{(1)}$ increases upwards and $\mu^{(2)}$ increases downwards as indicated. The acceptance interval 2020 for the first metric, $\mu^{(1)}$, herein referenced as the first acceptance interval, has a lower bound $\mu_1^{(1)}$ and an upper bound $\mu_2^{(1)}$. The acceptance interval 2040 for the second metric, $\mu^{(2)}$, hereinafter referenced as the second acceptance interval, has a lower bound $\mu_1^{(2)}$ and an upper bound $\mu_2^{(2)}$. The reference numerals 2022, 2024, 2026, and 2028 indicate values of the first metric corresponding to encoding-coefficient values of $E_1$, $E_2$, $E_3$, and $E_4$, where $E_1 < E_2 < E_3 < E_4$. The reference numerals 2042, 2044, 2046, and 2048 indicate values of the second metric corresponding to encoding-coefficient values of $E_1$, $E_2$, $E_3$, and $E_4$.

With the encoding coefficient set at a value $E_4$, for example, the value (2028) of the first metric is determined to be above the respective upper bound $\mu_2^{(1)}$ while the value (2048) of the second metric is determined to be within the second acceptance interval $(\mu_1^{(2)}, \mu_2^{(2)})$. Because the value of one of the two metrics is higher than the corresponding acceptance upper bound, the encoding coefficient is reduced by multiplying its current value by a factor $\chi_2 < 1$. The encoder 220 adjusts the encoding flow rate accordingly and new values for the two metrics are determined from fresh measurements taken after the adjustment of the flow rate. When the encoding coefficient is reduced to a value $E_3 < E_4$, the value (2026) of the first metric was determined to be within the first acceptance interval $(\mu_1^{(1)}, \mu_2^{(1)})$ while the value (2046) of the second metric was determined to be well below the lower bound $\mu_1^{(2)}$ of the second acceptance interval $(\mu_1^{(2)}, \mu_2^{(2)})$. No further changes to the encoding coefficient take place unless (1) the connection state deteriorates resulting in one of the metrics to exceeds its acceptance upper bound, in which case the encoding coefficient is further reduced or (2) the connection state improves so that the value of both the first and second metrics are below their respective acceptance lower bounds, thus providing an opportunity to increase the encoding coefficient.

With the encoding coefficient set at a value $E_1$, the value (2022) of the first metric $\mu^{(1)}$ is determined to be below the lower bound $\mu_1^{(1)}$ and the value (2042) of the second metric is determined to be below the lower bound $\mu_1^{(2)}$. The encoding coefficient is increased to a value $E_2$. Consequently, the value of the second metric $\mu^{(2)}$ increased to a value (2044) which is within the acceptance interval $(\mu_1^{(2)}, \mu_2^{(2)})$ but close to the upper bound $\mu_2^{(2)}$. The first metric $\mu^{(1)}$ increased to a value (2024) which is still below the lower bound $\mu_1^{(1)}$. With no change in connection transmittance, a further increase of the encoding coefficient may increase the second metric $\mu^{(2)}$ to a value above the upper bound $\mu_2^{(2)}$. No further changes to the encoding coefficient take place until the connection state changes sufficiently to either provide an opportunity for increasing the encoding coefficient or force decreasing the encoding coefficient.

Figure 21:
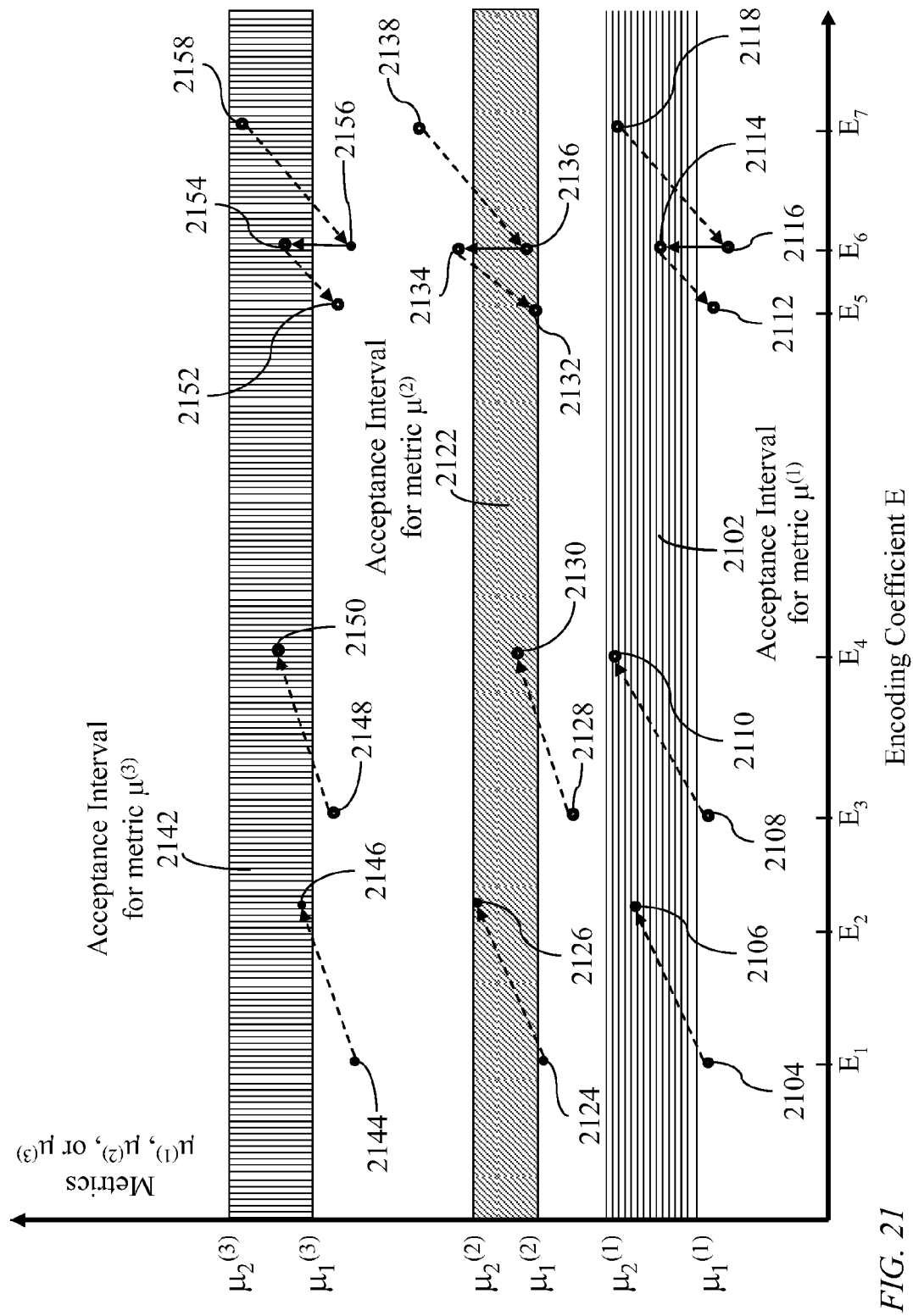
FIG. 21 illustrates an extension of the process described with reference to FIG. 17 for adjusting an encoding coefficient according to current values of three metrics.

FIG. 21 illustrates the method of encoding-coefficient adjustment according to current values of three metrics $\mu^{(1)}$, $\mu^{(2)}$, and $\mu^{(3)}$. Three acceptance intervals 2102, 2122, and 2142, for the first metric $\mu^{(1)}$, the second metric $\mu^{(2)}$, and the third metric, respectively, are drawn as non-overlapping stripes for clarity. It is understood, however, that the three metrics, which may represent different characteristics of a connection, are treated separately. Thus, the positions of acceptance intervals 2102, 2122, and 2142 for metrics $\mu^{(1)}$, $\mu^{(2)}$, and $\mu^{(3)}$, respectively, do not reflect their relative values. The first acceptance interval 2102 has a lower bound $\mu_1^{(1)}$ and an upper bound $\mu_2^{(1)}$. The second acceptance interval 2122 for the second metric, $\mu^{(2)}$ has a lower bound $\mu_1^{(2)}$ and an upper bound $\mu_2^{(2)}$.

The third acceptance interval 2142 for the third metric, $\mu^{(3)}$ has a lower bound $\mu_1^{(3)}$ and an upper bound $\mu_2^{(3)}$. Reference numerals 2104, 2106, 2108, 2110, 2112, 2114, 2116, and 2118 indicate values of the first metric $\mu^{(1)}$ corresponding to encoding-coefficient values of $E_1$ to $E_7$, where $E_j < E_{j+1}$, $1 \leq j \leq 6$. Likewise, reference numerals 2124, 2126, 2128, 2130, 2132, 2134, 2136, and 2138 indicate values of the second metric $\mu^{(2)}$ corresponding to $E_1$ to $E_7$, and reference numerals 2144, 2146, 2148, 2150, 2152, 2154, 2156, and 2158 indicate values of the third metric $\mu^{(3)}$ corresponding to $E_1$ to $E_7$.

Consider a case where the adaptable encoder 220 has adjusted its encoding parameters according to a nominal rate and an encoding coefficient $E_1$. A metric vector determined at the end of a specific window has metric values for $\mu^{(1)}$, $\mu^{(2)}$, and $\mu^{(3)}$ indicated by 2104, 2124, 2144. The values 2104, 2124 and 2144 are below the lower bound of their respective acceptance intervals. Therefore, the encoding coefficient is increased in steps until any of the three metrics $\{\mu^{(1)}, \mu^{(2)}, \mu^{(3)}\}$, determined from measurements taken after each step, is sufficiently close an upper bound of a respective acceptance zone. In the example of FIG. 21, this condition is met at the value of metric $\mu^{(2)}$ indicated by 2126 after the adaptable encoder 220 adjusts its flow rate to correspond to an encoding coefficient $E_2$.

For the case where the adaptable encoder 220 has adjusted its encoding parameters according to a nominal rate and an encoding coefficient $E_3$, the values of metrics $\mu^{(1)}$, $\mu^{(2)}$, and $\mu^{(3)}$ indicated by 2108, 2128, and 2148 are below their respective acceptance intervals. The encoding coefficient increased to a value $E_4$ at which the value of metric $\mu^{(1)}$ (reference 2110) was close to the upper bound of its acceptance interval while the values of metrics $\mu^{(2)}$, $\mu^{(3)}$ (2130 and 2150) were within their respective acceptance intervals.

For the case where the adaptable encoder 220 has adjusted its encoding parameters according to a nominal rate and an encoding coefficient $E_7$, the value of metric $\mu^{(2)}$, indicated by 2138 exceeds the upper bound of acceptance interval 2122. The encoding coefficient is reduced to a value $E_6 < E_7$. The metrics $\mu^{(1)}$ and $\mu^{(3)}$, decreased to values 2116 and 2156 below their respective acceptance intervals but metric $\mu^{(2)}$ decreased to a value 2136 within its acceptance interval 2122. Hence, the encoding coefficient remained unchanged at the value $E_6$. The connection transmittance decreased resulting in a subsequent increase in the metrics to values indicated by 2114, 2134, and 2154, respectively. With metric $\mu^{(2)}$ exceeding its upper bound, the encoding coefficient is reduced to a value of $E_5$.

Figure 22:
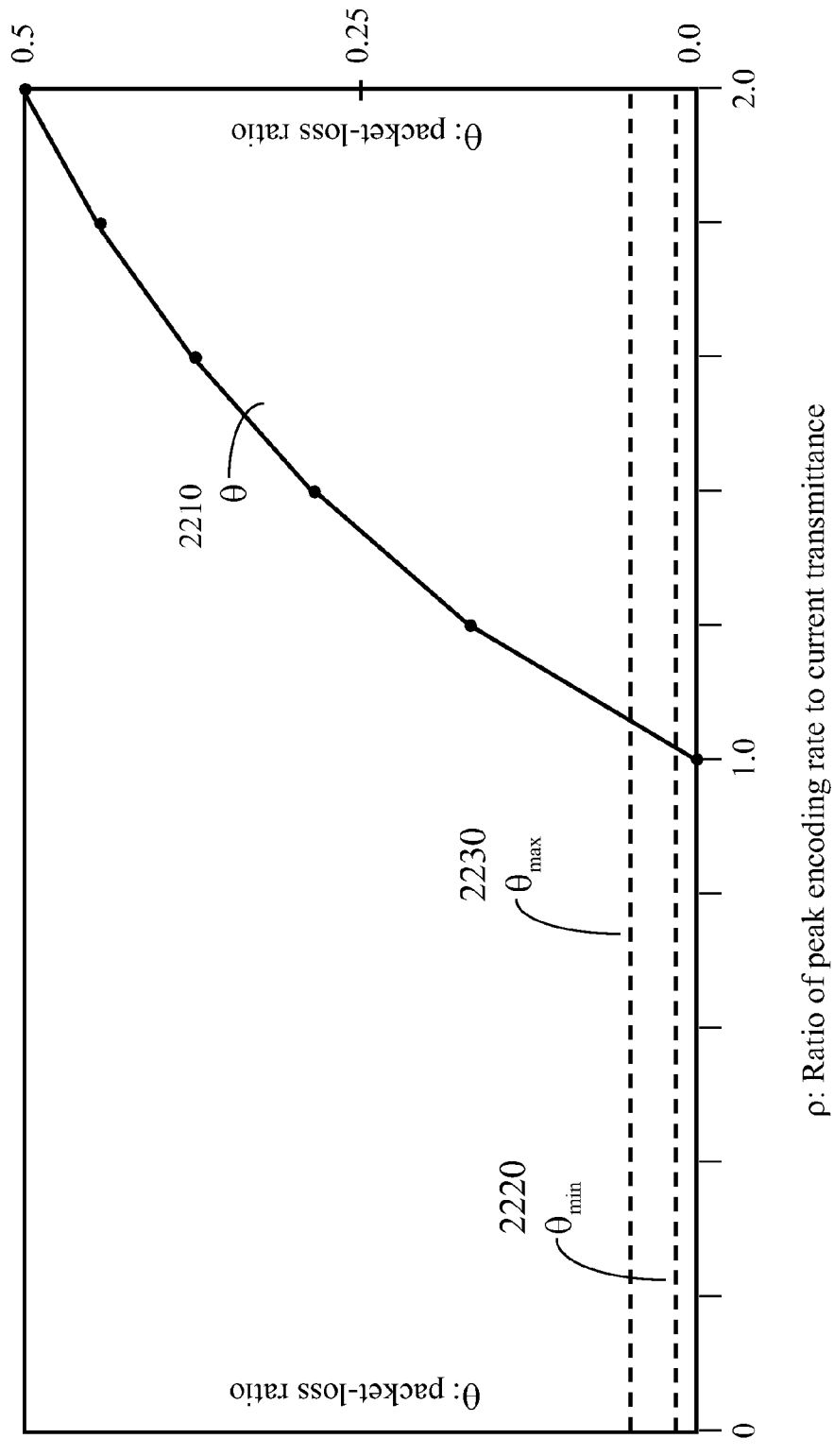
FIG. 22 illustrates variation of packet-loss ratio versus a ratio of encoding rate of a signal transmitted by a streaming server to connection transmittance for use in illustrating an embodiment of the present invention.

FIG. 22 illustrates packet-loss ratio $\theta$ as a function of the peak encoding rate (peak flow rate) of a signal transmitted by streaming server 120 over a connection to a client 160. As defined earlier, connection transmittance is the peak flow rate which can be sustained by a connection from a streaming server to a client without violating preset performance objectives. In the example of FIG. 22, the transmittance is defined according to the packet-loss performance only. FIG. 22 illustrates an exemplary relation between the packet-loss ratio and the peak encoding rate normalized with respect to the transmittance of the connection. The peak encoding rate is known. However, the transmittance of the connection may vary with time and may be unknown. If the peak encoding rate is higher than the transmittance, then the packet-loss ratio θ is greater than zero and the ratio of the peak encoding rate to transmittance may be determined as $1/(1-\theta)$ and the encoding rate may be reduced by a factor $(1-\theta)$ to eliminate packet loss. The packet-loss ratio may be measured over a selected time window as described above. Line 2210 illustrates the packet-loss ratio θ as a function of the ratio ρ of the peak encoding rate to current transmittance. The value of θ is zero for $\rho \leq 0.0$. At $\rho=1.5$, $\theta=0.33$, and at $\rho=2.0$, $\theta=0.5$.

If the measured value of θ is zero, then the ratio of the peak encoding rate to transmittance may be anywhere above 0 and less than 1.0, and it is difficult to accurately determine an appropriate increase of the encoding rate (i.e., an increase of the encoding coefficient E) which would improve signal fidelity while avoiding packet loss. The encoding rate may be increased in steps until packet loss is measured (θ>0) and the encoding rate may then be corrected accordingly. When the measured value of θ is considerably small, e.g., of the order of 0.001, encoding-rate correction may not be necessary. An acceptance interval defined by a lower bound $\theta_{min}$ (line 2220) and an upper bound $f_{max}$, (line 2230) of packet-loss ratio helps in avoiding unnecessary processing for small values of θ. The values of $\theta_{min}$ and $\theta_{max}$ are design parameters. A value of $\theta_{min}$ of 0.001 and a value of $\theta_{max}$ of 0.02 may be considered adequate.

A computer readable medium, e.g., a DVD, CD-ROM, floppy, or a memory such as non-volatile memory, comprising instructions stored thereon, when executed by a processor, to perform the steps of the methods described above, is also provided.

Although specific embodiments of the invention have been described in detail, it should be understood that the described embodiments are intended to be illustrative and not restrictive. Various changes and modifications of the embodiments shown in the drawings and described in the specification may be made within the scope of the following claims without departing from the scope of the invention in its broader aspect.

What is claimed is:

1. A method of data streaming from an encoder to a decoder through a time-varying connection, comprising:
    employing at least one processor for:
        associating an encoding coefficient with said time-varying connection, said encoding coefficient determining a flow rate at an output of said encoder;
        defining a performance metric of said time-varying connection as a function of occupancy, during a time window, of a decoder buffer holding data received through said time-varying connection;
        defining an acceptance interval of said performance metric having a lower bound and an upper bound;
        acquiring a set of performance measurements of said time-varying connection over said time window at a current encoding coefficient;
        determining a current value of said metric of said time-varying connection according to said set of measurements;
        determining a preferred encoding coefficient according to said current value of said metric; and
        multiplying said current encoding coefficient by a factor determined as a function of said lower bound, said upper bound, and said current value of said metric.

2. The method of claim 1 further comprising modifying the current encoding coefficient based on a comparison of said current value and said acceptance interval.

3. The method of claim 2 further comprising decreasing said current encoding coefficient to produce said preferred encoding coefficient, provided said current value of said metric exceeds said upper bound.

4. The method of claim 1 further comprising increasing said current encoding coefficient to produce said preferred encoding coefficient, provided said current value of said metric is lower than said lower bound.

5. The method of claim 1 further comprising determining a first factor for increasing said current encoding coefficient and a second factor for decreasing said current encoding coefficient, wherein a product of said first factor and said second factor is less than 1.

6. The method of claim 1 further comprising instructing said encoder to encode a signal according to said preferred encoding coefficient and a nominal encoding rate.

7. The method of claim 1 wherein said function further accounts for transfer delay from said encoder to said decoder during said time window.

8. The method of claim 1 wherein said function further accounts for data loss during said time window.

9. A non-transitory computer readable storage medium, comprising computer readable instructions stored thereon for execution by a processor, to perform the steps of the method of claim 1.

10. A streaming server for data streaming from an encoder to a decoder through a time-varying connection, the streaming server comprising a hardware processor, and a memory device storing computer readable instructions causing said processor to:
    associate an encoding coefficient with said time-varying connection, said encoding coefficient determining a flow rate at an output of said encoder;
    define a performance metric of said time-varying connection as a function of occupancy, during a time window, of a decoder buffer holding data received through said time-varying connection;
    define an acceptance interval of said performance metric having a lower bound and an upper bound;
    acquire a set of performance measurements of said time-varying connection over said time window at a current encoding coefficient;
    determine a current value of said metric of said time-varying connection according to said set of measurements;
    determine a preferred encoding coefficient according to said current value of said metric; and
    multiply the current encoding coefficient by a factor determined as a function of the lower bound, the upper bound, and the current value of said metric.

11. The streaming server of claim 10, wherein the computer readable instructions further cause the processor to modify the current encoding coefficient based on a comparison of said current value and said acceptance interval.

12. The streaming server of claim 10, wherein the computer readable instructions further cause the processor to determine a first factor for increasing said current encoding coefficient and a second factor for decreasing said current encoding coefficient, wherein a product of said first factor and said second factor is less than 1.

13. The streaming server of claim 10, wherein the computer readable instructions further cause the processor to increase said current encoding coefficient to produce said preferred encoding coefficient, provided said current value of said metric is lower than said lower bound.

14. The streaming server of claim 10, wherein the computer readable instructions further cause the processor to decrease said current encoding coefficient to produce said preferred encoding coefficient, provided said current value of said metric exceeds said upper bound.

15. The streaming server of claim 10 wherein the computer readable instructions further cause the processor to instruct said encoder to encode a signal according to said preferred encoding coefficient and a nominal encoding rate.

16. The streaming server of claim 10 wherein said function further accounts for transfer delay from said encoder to said decoder during said time window.

17. The streaming server of claim 10 wherein said function further accounts for data loss during said time window.

18. The streaming server of claim 10, the streaming server being configured to exchange control data between said encoder and said decoder using a real-time transport protocol (RTP) and the real-time transport control protocol (RTCP).

19. The streaming server of claim 10 wherein said time-varying connection is configured to carry a video signal and wherein said computer readable instructions further cause the processor to modify at least one of:
- a frame rate of said video signal; and
- content per frame.

20. A system for data streaming, comprising:
- a plurality of client devices, each client device having a client processor and a respective decoder; and
- a streaming server for data streaming from an encoder to a decoder through a time-varying connection, the streaming server comprising a hardware processor, and a memory device having storing computer readable instructions stored thereon, causing said processor to:
- associate an encoding coefficient with said time-varying connection, said encoding coefficient determining a flow rate at an output of said encoder;
- define a performance metric of said time-varying connection as a function of occupancy, during a time window, of a decoder buffer holding data received through said time-varying connection;
- define an acceptance interval of said performance metric having a lower bound and an upper bound;
- acquire a set of performance measurements of said time-varying connection over said time window at a current encoding coefficient;
- determine a current value of said metric of said time-varying connection according to said set of measurements;
- determine a preferred encoding coefficient according to said current value of said metric; and
- multiply the current encoding coefficient by a factor determined as a function of the lower bound, the upper bound, and the current value of said metric.

* * * * *

UNITED STATES PATENT AND TRADEMARK OFFICE
CERTIFICATE OF CORRECTION

PATENT NO. : 8,255,559 B2
APPLICATION NO. : 13/417271
DATED : August 28, 2012
INVENTOR(S) : Francis Roger Labonte et al.

It is certified that error appears in the above-identified patent and that said Letters Patent is hereby corrected as shown below:

Title Page 2, Item (56) References Cited, Foreign References:

Delete the first instance of the double citation of the reference by Ohno, "EP 1821442 dated 8/2005".

Signed and Sealed this
Twenty-eighth Day of May, 2013

Teresa Stanek Rea
*Acting Director of the United States Patent and Trademark Office*